(12) United States Patent
Libert et al.

(10) Patent No.: US 11,276,007 B2
(45) Date of Patent: *Mar. 15, 2022

(54) METHOD AND SYSTEM FOR COMPOSITE SCORING, CLASSIFICATION, AND DECISION MAKING BASED ON MACHINE LEARNING

(71) Applicant: AIMATTERS, INC., Sherborn, MA (US)

(72) Inventors: Barry D. Libert, Sherborn, MA (US); Megan Beck, Dallas, TX (US)

(73) Assignee: AIMATTERS, INC., Sherborn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,008

(22) Filed: Feb. 25, 2020

(65) Prior Publication Data

US 2020/0193312 A1 Jun. 18, 2020

Related U.S. Application Data

(63) Continuation of application No. 15/485,211, filed on Apr. 11, 2017, now Pat. No. 10,614,363.
(Continued)

(51) Int. Cl.
*G06N 5/04* (2006.01)
*G06N 20/00* (2019.01)
(Continued)

(52) U.S. Cl.
CPC ......... *G06N 5/045* (2013.01); *G06F 16/2465* (2019.01); *G06F 16/285* (2019.01);
(Continued)

(58) Field of Classification Search
None
See application file for complete search history.

(56) References Cited

U.S. PATENT DOCUMENTS 7,340,428 B1 3/2008 White et al.
7,693,733 B2 4/2010 Eder
(Continued)

FOREIGN PATENT DOCUMENTS

WO 2000034911 A2 6/2000

OTHER PUBLICATIONS

International Search Report & Written Opinion issued in PCT/US2017/027075 dated Jun. 27, 2017.
(Continued)

*Primary Examiner* — Leland Marcus
(74) *Attorney, Agent, or Firm* — Procopio, Cory, Hargreaves & Savitch LLP

(57) ABSTRACT

To clear a blindspot in the way business leaders, analysts and investors make decisions about capital investments in various businesses, the present inventors devised, among other things, business model classification, search, and analysis systems and methods. One exemplary system automatically classifies businesses based on quantitative and qualitative business data according to a 4-class framework that spans traditional industry boundaries. This classification is based on a combination of spending patterns, financial metrics, and language to identify each firm's business model. The resulting business model is then utilized in conjunction with additional financial and non-financial metrics, securities analysis, leading and lagging indicators, and/or industry comparison to produce a score which can be used to compare business performance within and across classifications to generate superior performance and mitigate risks for business leaders and investment managers.

20 Claims, 17 Drawing Sheets

Performance of a $1 Investment in 2008 by Business Model

Related U.S. Application Data

(60) Provisional application No. 62/321,165, filed on Apr. 11, 2016.

(51) Int. Cl.
*G06F 16/28* (2019.01)
*G06F 16/2458* (2019.01)
*G06Q 10/00* (2012.01)
*G06Q 40/00* (2012.01)

(52) U.S. Cl.
CPC ............ *G06N 20/00* (2019.01); *G06Q 10/00* (2013.01); *G06Q 40/12* (2013.12)

(56) References Cited

U.S. PATENT DOCUMENTS

| | | | |
|---|---|---|---|
| 7,971,180 | B2 | 6/2011 | Kreamer |
| 8,170,925 | B1 | 5/2012 | Hines et al. |
| 8,255,306 | B1 | 8/2012 | Thomson |
| 2003/0110106 | A1* | 6/2003 | Deshpande ............ G06Q 40/00 705/35 |
| 2005/0071185 | A1 | 3/2005 | Thompson |
| 2006/0004701 | A1 | 1/2006 | Bacon |
| 2006/0129441 | A1 | 6/2006 | Yankovich |
| 2008/0065471 | A1 | 3/2008 | Reynolds |
| 2009/0192867 | A1 | 7/2009 | Farooq |
| 2010/0179845 | A1 | 7/2010 | Davison |
| 2010/0306249 | A1 | 12/2010 | Hill |
| 2011/0264649 | A1 | 10/2011 | Hsiao |
| 2012/0296845 | A1 | 11/2012 | Andrews |
| 2014/0075004 | A1* | 3/2014 | Van Dusen ....... G06F 16/90335 709/223 |
| 2014/0164290 | A1 | 6/2014 | Salter |
| 2014/0278786 | A1 | 9/2014 | Liu-Qiu-Yan |
| 2015/0302436 | A1 | 10/2015 | Reynolds |
| 2016/0048922 | A1 | 2/2016 | Stearns |
| 2016/0140320 | A1 | 5/2016 | Moturu |
| 2016/0203494 | A1 | 7/2016 | Galligan Davila |
| 2016/0239766 | A1 | 8/2016 | Cameron |
| 2017/0243236 | A1 | 8/2017 | Dhillon |
| 2018/0075554 | A1 | 3/2018 | Clark |

OTHER PUBLICATIONS

Second Written Opinion issued in PCT/US2017/027075 dated Mar. 23, 2018.

\* cited by examiner

| | Asset Builder factors | Description | Estimate Coefficient | | Std. Error | z value | Pr(>|z|) | Asset class |
|---|---|---|---|---|---|---|---|---|
| x1 | FF_INVEN_CURR_ASSETS | Inventories % current assets | b1 | 0.1039646 | 0.0100488 | 10.345981 | 0 | P |
| x2 | FF_EBITDA_OPER_MGN | EBITDA margin | b2 | 0.0522612 | 0.0076992 | 6.787896 | 0 | F |
| x3 | FF_COGS_SALES | Cost of goods sold % sales | b3 | 0.0457606 | 0.0051602 | 8.868033 | 0 | P |
| x4 | site | | b4 | 0.0351746 | 0.0100535 | 3.498744 | 0.0004675 | P |
| x5 | expenditur | | b5 | 0.0338606 | 0.0122344 | 2.767664 | 0.005646 | Fi |
| x6 | FF_TCAP_ASSETS | Capital (total) % Total Assets | b6 | 0.0199976 | 0.0057845 | 3.457116 | 0.000546 | P |
| x7 | equip | | b7 | 0.0106628 | 0.0037766 | 2.823426 | 0.0047613 | P |
| x8 | sale | | b8 | 0.0060195 | 0.0014705 | 4.093429 | 0.0000426 | F |
| x9 | FF_AMORT_CF | Amortization of intangible assets | b9 | -0.00008193 | 0.00041334 | -1.982176 | 0.0474695 | I |
| x10 | document | | b10 | -0.0456968 | 0.0139358 | -3.279083 | 0.0010414 | |
| x11 | reform | | b11 | -0.0666664 | 0.0194587 | -3.426041 | 0.0006124 | N |
| x12 | FF_RD_SALES | Research & Development % sales | b12 | -0.1872451 | 0.0198274 | -9.443778 | 0 | I |
| x13 | understand | | b13 | -0.1912515 | 0.0355003 | -6.387316 | 0.0000001 | II |

FIG. 3A

| Service provider factors | | Description | Estimate Coefficient | | Std. Error | z value | Pr(>\|z\|) | Asset class |
|---|---|---|---|---|---|---|---|---|
| x1 | understand | | b1 | 0.1630879 | 0.0401743 | 4.059508 | 0.0000492 | I |
| x2 | reform | | b2 | 0.108471 | 0.0230566 | 4.704553 | 0.0000025 | N |
| x3 | help | | b3 | 0.0652986 | 0.0178477 | 3.658651 | 0.00002535 | H |
| x4 | consult | | b4 | 0.0329499 | 0.0100901 | 3.265576 | 0.0010924 | H |
| x5 | FF_PAY_TURN_DAYS | Days of payables outstanding | b5 | -0.0119371 | 0.0042692 | -2.796122 | 0.005172 | F |
| x6 | expenditur | | b6 | -0.0359644 | 0.0124035 | -2.899538 | 0.0037371 | F |
| x7 | competiti | | b7 | -0.0379212 | 0.0101359 | -3.741283 | 0.0001831 | |
| x8 | FF_COGS_SALES | Cost of goods sold % sales | b8 | -0.0388566 | 0.0044855 | -8.685081 | 0 | P |
| x9 | FF_EBITDA_OPER_MGN | EBITDA margin | b9 | -0.0488922 | 0.0064118 | -7.625297 | 0 | F |
| x10 | site | | b10 | -0.0733475 | 0.0162421 | -4.51588 | 0.0000063 | P |
| x11 | FF_INVEN_CURR_ASSETS | Inventories % current assets | b11 | -0.1041184 | 0.0115464 | -9.017411 | 0 | P |
| x12 | FF_RD_SALES | Research & Development % sales | b12 | -0.2572026 | 0.023437 | -10.974188 | 0 | I |

| | Technology Creator factors | Description | Estimate Coefficient | | Std. Error | z value | Pr(>|z|) | Asset class |
|---|---|---|---|---|---|---|---|---|
| x1 | FF_RD_SALES | Research & Development % sales | b1 | 0.4993627 | 0.0379989 | 13.14149 | 0 | I |

Fig. 3D

| | Network Orchestrator factors | Description | Estimate Coefficient | | Std. Error | z value | Pr(>|z|) | Asset class |
|---|---|---|---|---|---|---|---|---|
| x1 | FF_PSALES | Price to sales (close last trade day) | b1 | 106.3695517 | 1.98E+06 | 0.0000536 | 0.9999572 | F |
| x2 | daily_active.users | | b2 | 1.8478269 | 7081E-01 | 2.3671609 | 0.0179251 | R |
| x3 | FF_CAPEX_FIX_ASSETS | Capital Expenditure % Gross Fixed Assets | b3 | 0.0598233 | 1.89E-02 | 3.1652531 | 0.0015495 | P |
| x4 | around | | b4 | 0.053208 | 7.52E-02 | 0.7076412 | 0.4791681 | |
| x5 | websit | | b5 | 0.040794 | 9.45E-03 | 4.3181276 | 0.0000157 | R |
| x6 | list | | b6 | 0.0217204 | 2.02E-02 | 1.0739973 | 0.2828239 | R |
| x7 | platform | | b7 | 0.0158648 | 1.03E-02 | 1.5408521 | 0.1233528 | R |
| x8 | transact | | b8 | 0.0118506 | 5.40E-03 | 2.1950904 | 0.0281571 | R |
| x9 | trade | | b9 | 0.010718 | 3.46E-03 | 3.0944888 | 0.0019715 | R |
| x10 | user | | b10 | 0.0042605 | 7.36E-03 | 0.5788859 | 0.5626661 | R |
| x11 | FF_RECEIV_TURN_DAYS | Accounts receivable days | b11 | 0.0010564 | 6.77E-04 | 1.5615796 | 0.118387 | F |
| x12 | FF_DEBT_RECEIV_CR_CARD | Credit card receivables | b12 | 0.0004363 | 1.58E-04 | 2.7692374 | 0.0056188 | F |
| x13 | FF_RECEIV_TOT | Total accounts receivable | | 0.000074 | 6.45E-05 | 1.1469719 | 0.2513932 | F |
| x14 | FF_COM_SHS_AUTH | Number of shares authorized | | 0.0000443 | 1.10E-04 | 0.4046164 | 0.6857595 | F |
| x15 | FF_DEBT_BONDS_OTH | Bonds - other borrowings | | -0.9122148 | 1.10E+02 | -0.0082623 | 0.9934077 | F |
| x16 | FF_PSALES_DIL | Price to sales diluted | | -106.1861638 | 1.98E+06 | -0.0000535 | 0.9999573 | F |

| COMPOSITION | | |
|---|---|---|
| Facebook, Inc. | Acordia Therapeutics, Inc. | SurModics, Inc. |
| Red Hat, Inc. | Broadcom Corp. | Align Technology, Inc. |
| Discover Financial Services | Varian Medical Systems, Inc. | Synopsys, Inc. |
| Visa, Inc. | LogMein, Inc. | Advent Software, Inc. |
| MarketAccess Holdings, Inc. | Informica Corp. | Moreotype Imaging Holdings, Inc. | VeriSign, Inc. |
| Intercontinental Exchange, Inc. | Salesforces.com, Inc. | Intuit, Inc. | Agilsys, Inc. |
| MasterCard, Inc. | Symantec Corp. | Kopex Brand Group, Inc. | Rangeroon Pharmaceuticals, Inc. |
| CME Group, Inc. | Microsot Corp | Blackbaud, Inc. | Adobe Systems, Inc. |
| American Express Co. | Bose Corp. | The Ultimate Software Group, Inc. | Victor Corp |
| WEX, Inc. | F5 Networks, Inc. | Synchroness Technologies, Inc. | Pfizer Inc. |
| Salk Pharmaceutical Ltd. | Albergan Inc. | XO Group, Inc. | Electronics for Imaging, Inc. |
| Silicon Laboratories, Inc. | United Therapeutics Corp. | Monsanto Co. | Ultratech, Inc. |
| InterDigital, Inc. | Harmonic, Inc. | Emogent BioSolutions, Inc. | Siena Dental Systems, Inc. |
| The Medicines Co. | Sematech Corp | Bristol-Meyers Squibb Co. | Ixia |
| iRobot Corp. | Xilinx, Inc. | Bio-Techne Corp. | Compuware Corp. |
| QLogic Corp. | Power Integrations, Inc | Cisco Systems, Inc. | ION Geophysical Corp. |
| Netiscout Systems, Inc. | Thoratec Corp. | Monolithic Power Systems, Inc. | Factset Research Systems Inc. |
| ANSYS, Inc. | St. Jude Medical, Inc. | Qualcomm, Inc. | Lam Research Corp. |
| SolarWinds, Inc. | CSG Systems International, Inc. | Abiomed, Inc. | KLA-Teracor Corp. |
| Electronic Arts, Inc. | Stryker Corp. | Progress Software Corp. | Qorvo, Inc. |
| Netflix, Inc. | MicroStrategy, Inc. | Boston Scientific Corp. | |

FIG. 12 A

METHOD AND SYSTEM FOR COMPOSITE SCORING, CLASSIFICATION, AND DECISION MAKING BASED ON MACHINE LEARNING

CROSS-REFERENCE TO RELATED APPLICATIONS

This application is a continuation of U.S. patent application Ser. No. 15/485,211, filed Apr. 11, 2017, which claims the benefit of U.S. Provisional Patent Application No. 62/321,165, filed Apr. 11, 2016, the disclosures of each of which are hereby incorporated by reference in their entireties.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2016, Open Matters, Inc.

TECHNICAL FIELD

Various embodiments of the invention concern automated systems and methods for replacing or supplementing outmoded, conventional business classification systems based on industry, size, financial results or geography with new classifications that provide superior insights and wisdom for entrepreneurs, employees, and investors.

BACKGROUND

Everyday across the world, business leaders are making trade-offs, determining how to invest the limited resources of their organizations to grow their businesses and create greater value. These leaders are making complex decisions about what products and services to offer, whether to expand their work forces or invest in new machinery or equipment, whether to hire more sales people or more engineers, whether to borrow money or sell shares of the company, and so forth. In making these decisions, business leaders, as well as the investors (including debt holders) who back them, often look for outside guidance in the form of industry classifications that help them identify related businesses for purposes of understanding best practices and performance benchmarking.

One popular classification system, which presently classifies over 38,000 publicly traded companies based on their principal business activity, is the Global Industry Classification Standard (GICS), a four-tiered system of 11 sectors, 24 industry groups, 68 industries, and 157 sub-industries. Other systems, which can be used along with GICS, classify businesses based on their market capitalization (that is, the aggregate market value of their publicly traded stock), placing them into one of three categories: small cap, mid cap, and large cap. Another complementary system subjectively classifies businesses, more precisely their stocks, as growth, value, or income stocks, based on expectations for growth in stock price, perceived undervaluation of the stock in the market, or expected dividend income using accounting information.

The present inventors have recognized at least three problems with these industry and accounting-based classification systems. First, traditional industrial classification systems, like GICS (Global Industry Classification Standard), fail to recognize the blurring lines between industries and present overly simplistic views of many businesses. For example, Apple, maker of the iPhone smartphone and MacBook computers, is classified only within the GICS Information Technology sector, though it has significant activity within the telecommunication-services sector with its Facetime and iMessage services and within the consumer discretionary sector with its iTunes media platform. Google and Amazon likewise stretch across multiple classes, but are only classified in one. And network-based companies, like Facebook and LinkedIn, find it challenging to find any fitting industrial category at all.

Second, accounting-based key performance indicators, such as those based on market capitalization, revenue growth, expenses, or earnings, have limited value in identifying likely winning businesses in our digitally driven, information economy. In particular, conventional business valuation techniques are premised on book value (the difference between total assets and total liabilities of a business) and net cash flow. However, these accounting definitions of business value, sanctioned by Generally Accepted Accounting Principles (GAAP), treat financial and tangible assets (e.g., things and money) as the primary assets affecting business worth and future performance. Such accounting definitions of business value largely ignore the increasing relevance and value of intangible assets such as insights, intellect, data, and relationships, in determining market valuations. Studies, for example by the Brookings Institute and Ocean Tomo, have shown that since the 1970s, corporate tangible assets have been making a decreasing contribution to the total market value of publicly traded technology businesses, shrinking from 80% to less than 20% today. (See also Patent Cooperation Treaty Application Publication No. WO2000/034911 by Barry Libert et al. which further describes the widespread undercounting of intangibles.)

Third, industry and accounting-based classifications divide the business world into various data silos that make it difficult for business leaders and investors to see that many successful and unsuccessful businesses of various sizes countries, continents, industries, size, scale, etc. operate similarly in how they allocate their capital resources. These allocation patterns ultimately show up as successful or failed business models, offering valuable insights and clues to success for those who can see them. Moreover, even when a business model surfaces for public study, there are no common frameworks or methods for systematically comparing and contrasting it with others. This ultimately limits the ability of business leaders and investors to learn from the successes and failures of others.

Accordingly, the present inventors have identified a need for new ways of classifying businesses that transcend conventional industry categories, that provide deeper insight into what separates massively successful organizations from mediocre ones, and that facilitate understanding of successful and unsuccessful business models.

SUMMARY

To address this and/or other needs, the present inventors devised, among other things, exemplary systems, engines, databases, methods, and related components for classifying, scoring, searching, and/or analyzing businesses based on business model and/or related asset allocation and revenue patterns.

Various embodiments of the invention stem from the recognition that all organizations and their leaders draw upon the same five types of assets, but what differentiates each organization are the decisions leaders make in how to use or invest them. Based on these asset allocations, a company's business model emerges. By categorizing and indexing businesses based on their business models rather than traditional industry classifications, market capitalization, or other common metrics, leaders and investors can uncover new insights about competitiveness and value in a digital world.

More specifically, one embodiment uses machine learning to categorize organizations based on the participation in four cross-industry business model classes, specifically an asset builder class, a service provider class, a technology creator class, and a network orchestrator class, based on key performance metrics and textual descriptions for publicly traded businesses. Variants of this embodiment measure capital allocation data within the business and statistically correlate the business, using logistical regression analysis, with each of the four cross-industry business model classes, ultimately determining a composite business model score. Another embodiment utilizes the classification system and related insights to produce an index score, such as a Universal Business Model Score, which can be used to compare and rank business performance within and across multiple businesses regardless of industry, size, or geography.

Moreover, some embodiments monitor key business model indicators and alert business leaders if indicators suggest a business model evolving in an unintended way. In one embodiment, for example, the research and development (R&D) investment by a selected company is monitored as a proportion of sales. If a decline is detected, say from 17% to 10%, the system alerts the leader to the fact that capital investment patterns are not supporting the technology creator business model. This would allow the business leader to proactively reconsider and readjust allocations to support the desired business model.

Ultimately, these and other embodiments of the invention allow business decision makers to make better investment decisions and help investment professionals to choose between business models based on financial and non-financial analysis in order to generate superior performance while also mitigating risks.

BRIEF DESCRIPTION OF THE DRAWINGS

Various embodiments are described herein with reference to the following attached figures (Figs). The figures are annotated with reference numbers for various features and components, and these numbers are used in the following description as a teaching aid, with like numbers referring to the same or similar features and components.

FIGS. 3A-3D are tabular views of alternative business model class-defining data structures for use with system 100, corresponding to one or more embodiments of the present invention.

FIG. 12A is an example of a prototype ETF fund according to the present invention having 43 companies representing the top ten percent of Business Model scorings from the S&P 1500 companies.

DETAILED DESCRIPTION

This document, which incorporates drawings and claims, describes one or more specific embodiments of one or more inventions. These embodiments, offered not to limit but only to exemplify and teach the inventions, are shown and described in sufficient detail to enable those skilled in the art to implement or practice the invention(s). Thus, where appropriate to avoid obscuring the invention(s), the description may omit certain information known to those of skill in the art.

Overview

Some embodiments of the invention include a system and method that classifies businesses, based on reported financial and non-financial, as well as qualitative data, into a finite set of four or more industry-agnostic or industry-independent business model classes, such as asset builder, service provider, technology creator, and network orchestrator. The classifications are made through an automated methodology (derived through machine learning and artificial intelligence systems from sources such as annual and analysts reports, management information and disclosures, customer and employee insights and sentiment analysis, etc.) using a combination of spending patterns, financial metrics, and text mining analysis to identify not only a universal score that determines business capabilities, but also an organization's dominant business model classification, as well as the portfolio of business models it operates and how it spends and makes money (e.g. the capital allocation patterns of its leaders and board). The universal score, together with the organization's dominant business model and capital allocation patterns are then utilized to help leaders model different decisions that will improve their overall score, growth and performance. Moreover, additional embodiments include searchable databases of businesses that are preclassified and indexed according to their universal business score, top level and sub classifications or compositions as well as other desirable search criteria, more specifically, how a company allocates its capital. Additionally, for even more increased flexibility, some embodiments allow users to create their own classification schemes that can be used to classify businesses, create scores, and create related investment products.

Exemplary System

Figure 1:
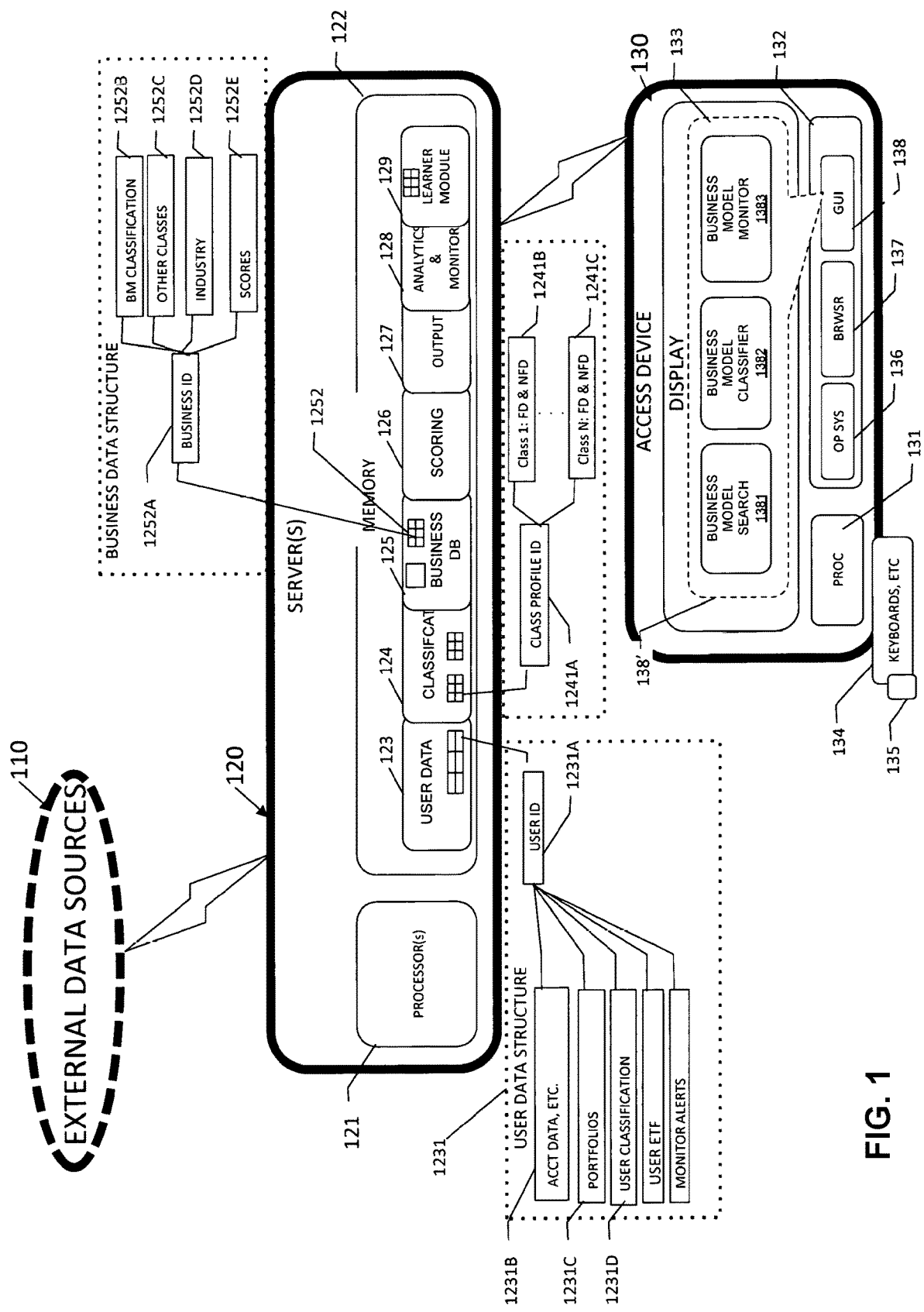
FIG. 1 is a block diagram of a classification and analysis system, corresponding to one or more embodiments to the present invention.

FIG. 1 shows an exemplary business model classification, search, and analysis system 100. System 100 includes data sources 110, a server module 120, and an access device 130.

Data sources 110 include publicly available data regarding various businesses. In the exemplary embodiment, the data includes annual reports, various SEC (Securities and Exchange Commission) filings, earnings reports for publicly traded business entities, as well as associated indices. Some embodiments include financial database products offered by Compustat or Factset which compile the information from annual reports and other sources. Some embodiments further include analogous data regarding privately held companies, and/or broader business related content, such as news articles, analysts research reports, customer reviews, social media posts, blog posts, brand reports, executive and board reports. Data stores 110, which take the exemplary form of one or more electronic, magnetic, or optical data-storage devices, are coupled or couplable via a wireless or wireline communications network, such as a local-, wide-, private-, or virtual-private network, to server 120, enabling data interchange via application program interface, JavaScript Object Notation, or electronic data interchange, or any convenient or desirable way of communicating data.

Exemplary Server(s)

Server 120, which is generally representative of one or more servers for serving data in a variety of desirable form, including for example webpages or other markup language forms with associated applets, remote-invocation objects, or other related software and data structures to service clients of various "thicknesses." More particularly, server 120 includes a processor module 121, a memory module 122.

Processor module 121 includes one or more local or distributed processors, controllers, or virtual machines. In the exemplary embodiment, processor module 121 assumes any convenient or desirable form.

Memory module 122, which takes the exemplary form of one or more non-transient electronic, magnetic, or optical data-storage devices, stores a user database module 123, a classification module 124, a scoring module 125, and a user output module 126, a ETF module 127, and a learner module 128.

User data module 123 includes user-related data and machine-executable instructions sets for controlling, administering, and managing user accounts and related activities conducted through system 100. In addition to one or more application program interfaces (APIs) (not shown) for accessing external data sources 110 or portions thereof associated with or accessible to specific users, user data module 123 includes user data structures, of which data structures 1231 is generally representative. Data structure 1231 includes a user identifier portion 1231A, which is logically associated with one or more data fields or objects 1231B-1231D.

Field 1231B includes account related data items, such as user name, password, name, address, organizational identifier(s), credit card or other billing account information, enterprise resource planning account(s) and access credentials, usage history, and access plans and permissions for various functions and features of system 100.

Field 1231C includes one or more lists or portfolios of business entities which the user has uploaded or otherwise entered and stored in association with his or her account. In the exemplary embodiment, each listed company may be associated with date stamped classifications and other scores generated for the user, along with the underlying data on which the classification and other scores are based.

Field 1231D includes one or more user-defined classification systems or schemes for use within classification module 124. In some embodiments, a user may upload or purchase classifications schemes or definitions (or access rights thereto) from other users.

Classification module (or engine) 124 includes data and machine-executable instructions for retrieving data regarding one or more selected business entities from data sources 110 and classifying or measuring each of the selected business entities according to a predefined set of cross-industry (industry-independent or -agnostic) business model classes based on logic determined by a machine learning algorithm. More particularly, module 124 includes class definitions data 1241 and classification logic 1242.

Class definitions data 1241, which in some embodiments is selected and/or associated with a given user or subset of users, define exclusion criteria (data or rules) 1241A and classification data or rules 1241B for classifying business entitles based on their associated data within a system of four business model classes. More specifically, exclusion criteria 1241A defines one or more attributes of business entities that would disqualify them from being classified. Exemplary exclusion criteria include business types, such as Real Estate Investment Trusts (REITs), and businesses having total revenues less than a threshold amount, such as $50M. Classification data 1241B includes not only quantitative financial criteria such as revenue, profitability, growth trends, return on assets, employee and sales expenses and research and development expenditures, but also qualitative textual criteria, such as keywords and/or phrases in annual reports and other documents to be used in classifying business entities according to a four-class business model classification system.

In the exemplary embodiment, the four classes are 1) asset builder, 2) service provider, 3) technology creator, and 4) network orchestrator. The asset builder (AB) business model refers to business activities such as building, developing, and leasing physical assets to make, market, distribute, and sell physical things. Examples of companies with principle activities focused on this model include Ford, Wal-Mart, and FedEx. The service provider (SP) business model refers to activities such as hiring employees who provide services to customers or produce billable hours for which they charge. Examples of companies with principle activities focused on this model include United Healthcare, Accenture, and JP Morgan. The technology creator (TC) business model encompasses behaviors such as developing and selling intellectual property in the form of software, analytics, pharmaceuticals, and biotechnology. Examples of companies focused on this model include Microsoft, Oracle, and Amgen. The network orchestrator (NO) business model encompasses behaviors such as creating a network of peers in which the participants interact and share in the value creation. The participants may sell products or services, build relationships, share advice, give reviews, collaborate, co-create and more. Examples include eBay, Red Hat, and Visa, Uber, Tripadvisor, and Alibaba. In one variation, classification module 124 classifies companies to one of the four classes. In another, it develops a composite business model profile, which represents each company as a weighted combination of the four classes, for example a linear combination, with each class weighted according to its proportionate or percentage presence within the activity of the company, adding up to 100%. Output of classification module 124 feeds into business model database 125 and scoring module 126, and output module 127.

Business model database 125 includes machine-executable instructions for generating, storing, indexing, and searching business module data structure based on classifications output from classification module 124. To this end, database 125 includes a search engine 1251 and a number of business model data structures 1252, of which business model data structure 1252A is generally representative. Business model data structure 1252A includes a business identifier field 1252B, and a number of logical associated fields or objects 1252B, 1252C, 1252D, and 1252E. Field 1252B allows searching of the business model via business name, unique identifier, ticker symbol, common name, and/or associated brands. Field 1252C stores data regarding the business model classification produced via classification module 124, including, for example, a predominant business model class and business model composite scores for not only the predominant class, but also other classes in the exemplary 4-class business model taxonomy. In some embodiments, field 1252C also includes the underlying data and an associated time stamp, enabling users ultimately to access that data and understand whether the classification is current. In still other embodiments, a series of date stamped classifications are stored enabling graphing of various outputs, such as a change in business model composition over time. Field 1252C stores business model classifications made using alternative classification taxonomies, such as those provided by users and stored or otherwise associated with user data structures. Field 1252D stores classifications according to industry classification systems, such as GICS, NAICS, SICS, and so forth, enabling searching of the business model database based not only on business model classifications, but also one or more industrial class identifiers. Field 125E stores scores produced via scoring module 126, enabling search, retrieval, and output these scores as well.

Scoring module 126 includes data and machine-executable instructions for processing classifications of business entities in combination with other financial metrics to produce various scores that are useful in analyzing businesses. These are described in greater detail below.

Output module 127 includes data and machine-executable instructs for outputting classifications and other data included within system 100 in various interactive or non-interactive forms as further detailed below.

Learner module 128 includes data and machine-executable instructions for updating the machine language training data and generating new coefficients and/or other parameters that govern how classifications are determined within the system. For example, some embodiments prompt specific users to manually approve or disapprove of a dominant classification for a company, analyze the quantity and quality of these responses and, if deemed appropriate, change the dominant classification of the company to reflect group sentiment. Users may also be prompted to add the company and its corresponding data to the training data for production of next generation classification profile.

Some embodiments include additional modulus for retrieving forward looking statements from annual reports and other corporate filings, performing sentiment analysis and text mining of these statements and determining based on logistical regression analysis or similarity metrics whether the statements and/or business decision data indicate that the business actions are in alignment with each other, providing alerts and other outputs to business leaders, investors, outlets, etc.

Exemplary Consumer Access Device(s)

Access device 130 is generally representative of one or more access devices. In the exemplary embodiment, access device 130, like access device 110, takes the form of a personal computer, workstation, personal digital assistant, mobile telephone, kiosk, or any other device capable of providing an effective user interface with a server or database. Specifically, access device 130 includes a processor module 131, a memory 132, a display 133, a keyboard 134, and a graphical pointer or selector 135. (In some embodiments, display 133 includes a touch screen capability.)

Processor module 131, which includes one or more processors, processing circuits, or controllers, is coupled to memory 132. Memory 132 stores code (machine-readable or executable instructions) for an operating system 136, a browser 137, and a graphical user interface (GUI) 138 (defined in whole or part by various modules within server 120). In the exemplary embodiment, operating system 136 and browser 137 not only receive inputs from keyboard 134 and selector 135, but also support rendering of GUI 138 on display 133.

Upon rendering, GUI 138, shown on display 133 as GUI 138', presents data in association with one or more interactive control features (or user-interface elements). In the exemplary embodiment, each of these control features takes the form of a hyperlink or other browser-compatible command input, and provides access to and control of various regions of the graphical user interfaces described herein.

More particularly, GUI 138 includes, among other things, a business model search region 1381, a classification request region 1382, and a business model monitor region 1383. Business model search region 1381 allows users to define and submit business model queries to server 120, specifically business database 125 for businesses, based on business class and/or one or more other criteria such as industry sector, subsector, market capitalization, etc. Classification request region 1382 allows users to enter or otherwise identify one or more business entities and submit a request that the entity be classified according to one or more selected business model classification schemes. In some embodiments, the available business model classification schemes include the four-class business model scheme described herein, in addition to one or more other business model or industry classifiers defined, for example by the requesting user or another user. Business model monitor region 1383 enables users to identify one or more business for business model monitoring. In some embodiments, it allows the user to enter a business and request to be notified if one or more financial or non-financial parameters that played a principle role the business's current business model classification or current business model composite score deviates by a certain percentage from a threshold amount or outside of a predetermined range. In some embodiments, the monitor includes electronic trading capabilities enabling automatic execution of stock trades in response to detected deviances. The system, in some embodiments, allows monitoring for business models that also transition into desired business models. For example, an asset builder company may be monitored to determine when it makes business decisions that resemble a technology creator or networker orchestrator business model. The determination may trigger an alert or a stock purchase.

Exemplary Method(s)

Figure 2A:
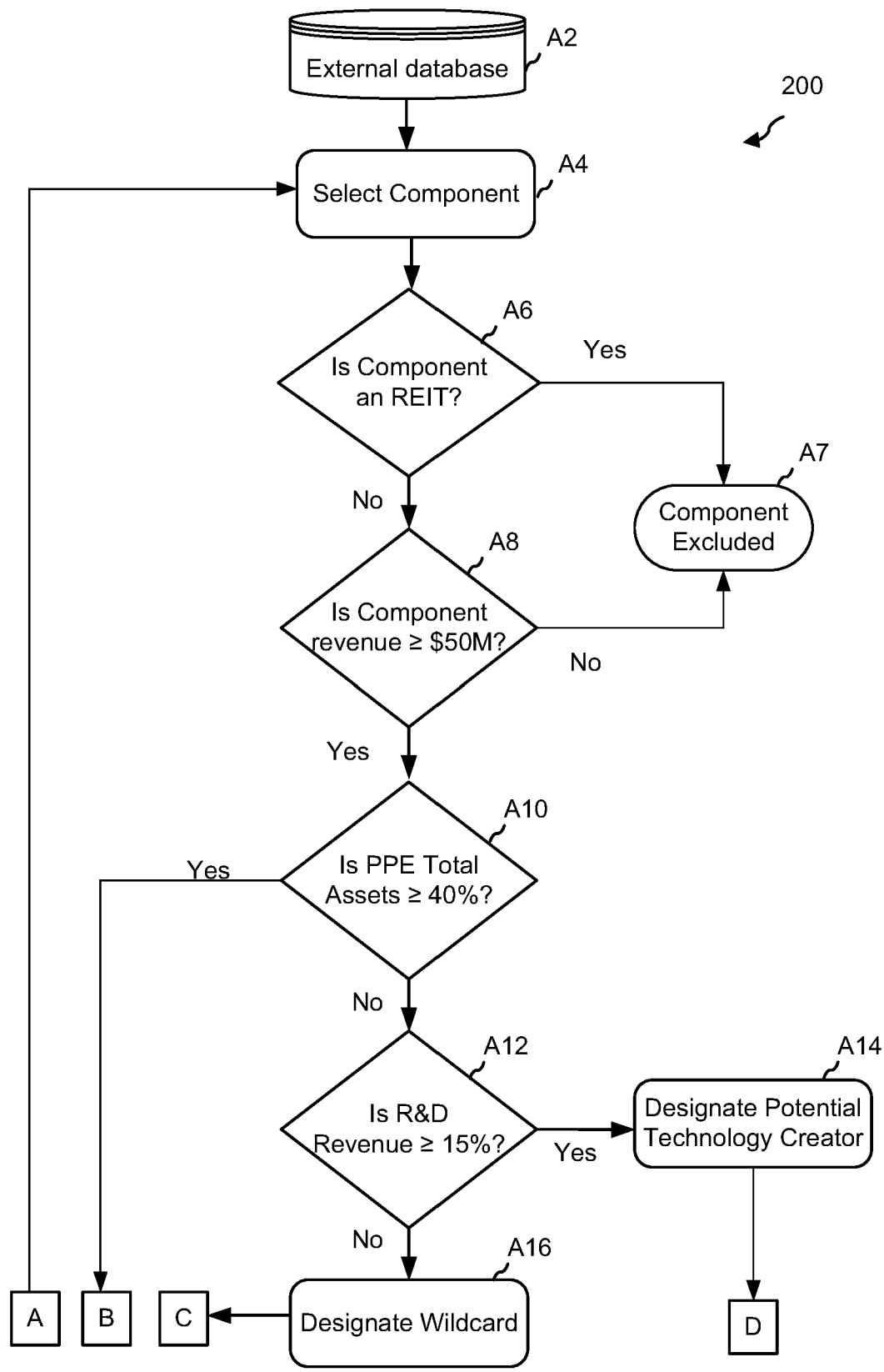
FIGS. 2A-C are consecutive flow charts of an exemplary business model classification method, corresponding to one or more embodiments of the present invention and showing an exemplary business model classification method.
Figure 2B:
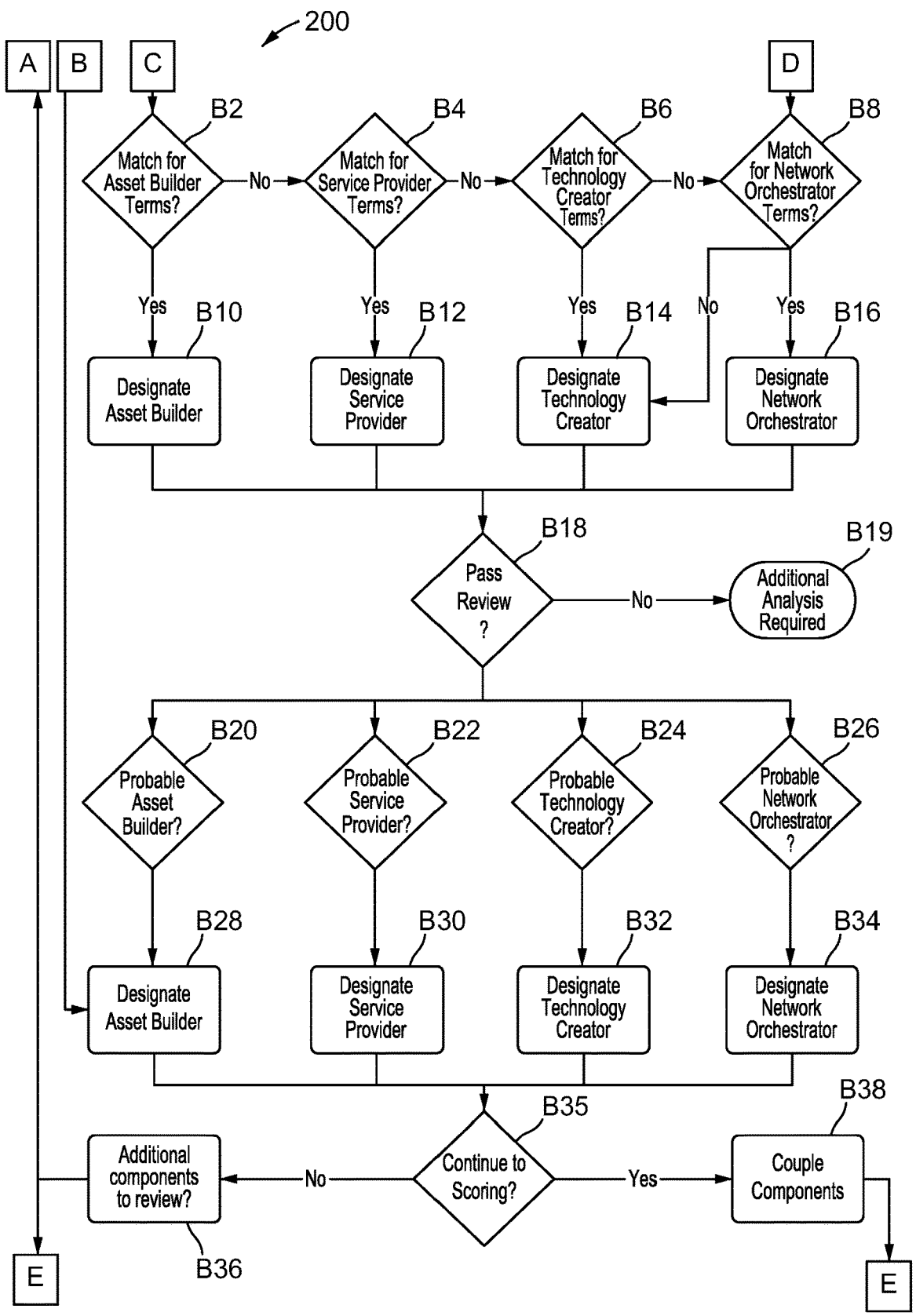
Figure 2C:
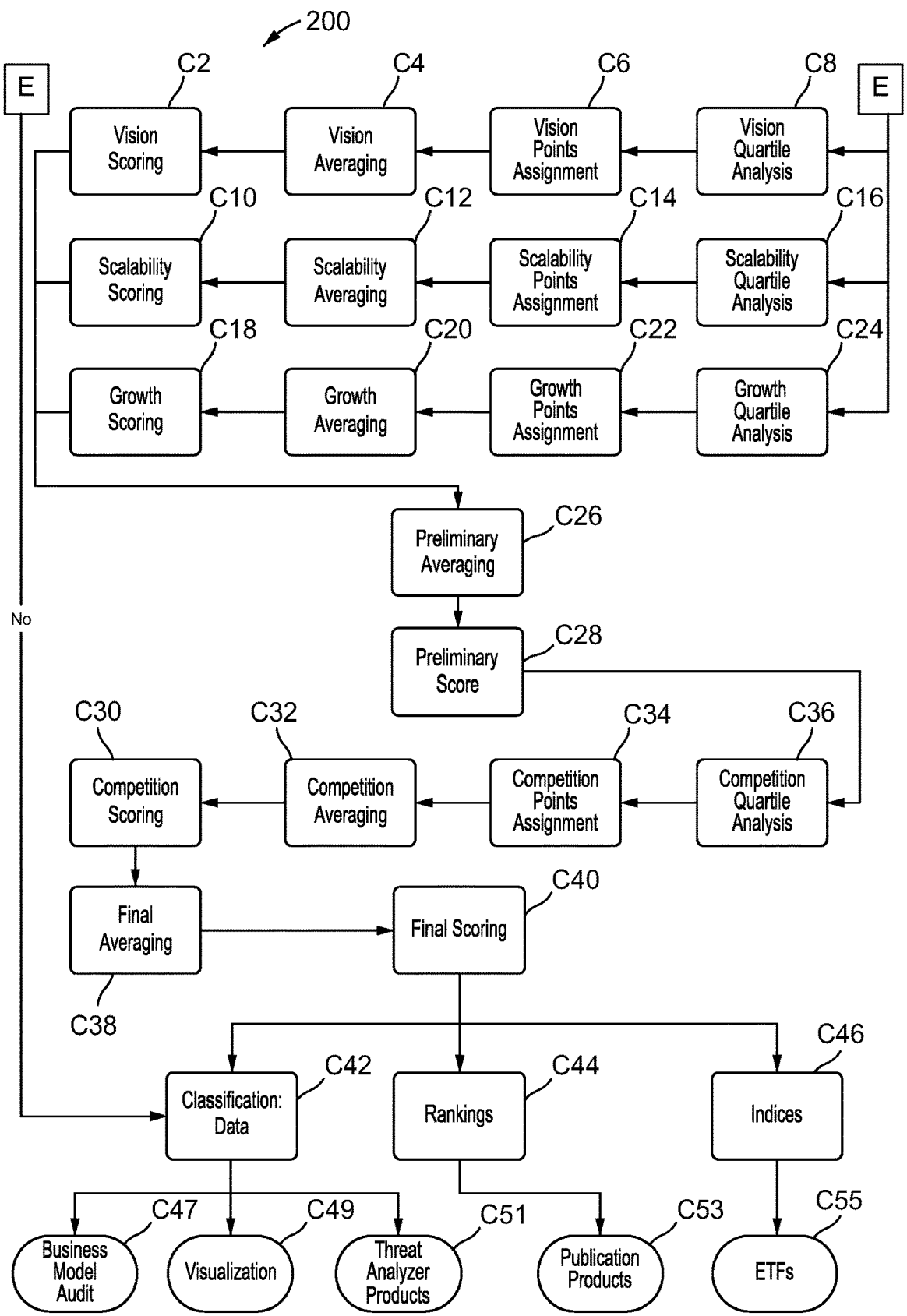

FIGS. 2A-2C shows a flow chart 200 of one or more exemplary methods of operating a business model classification, search, and analysis system, such as system 100. Flow chart 200 includes blocks or steps, which are arranged and described as a sequence in the exemplary embodiment for sake of clarity. However, other embodiments may change the order of two or more of the blocks or execute two or more of the blocks in parallel. Moreover, still other embodiments implement the blocks as two or more interconnected hardware modules with related control and data signals communicated between and through the modules. Thus, the exemplary process flow applies to software, hardware, and firmware implementations.

At step or block A2, the exemplary method begins with retrieval of data from external databases, such as external databases 110, based on a set of one or more identified business entities, also referred to herein as companies or components. In some embodiments, the components are provided as a list structure stored as part of user data within server 120 or entered or uploaded from access device 130 (both in FIG. 1). The components (companies) in the database typically will be classified one by one; however, some embodiments may employ parallel processing. A component is selected in step A4. The system begins with the first component in the database or user provided list, and retrieves the next component each time the process returns to step A4 as indicated by arrow A-A from step B36, FIG. 2B. Execution continues at step A6. Some embodiments provide a step for retrieving a desired classification profile, for example based on a user menu selection at access device 130, which determines various thresholds and other aspects of the classification process defined below.

In decision steps A6 and A8 the system checks for data that indicates the component should be excluded from the database. Specifically, decision step A6 entails checking if the component is a disqualified entity such as a Real Estate Investment Trust (REIT) or a Master Limited Partnership (MLP). If so, the component is excluded at block A7 because REITs and MLPs have specific payout structures for investors that make them not comparable to other companies on some key indicators, such as price-to-revenue ratio. Decision step A8 checks to see if the component's revenue is greater than or equal to $50M. If it is not, the component is also excluded at block A7 because very low revenues often indicate a company in high growth and investment mode, and reduces comparability to other companies on key indicators that are measured in comparison to revenue. An example of this is pre-revenue biotech and pharmaceutical companies, which have significant R&D spending in proportion to very low or non-existent revenue. If the component is not excluded, execution of the exemplary method advances to decision step A10.

Decision step A10 entails deciding whether the component is an asset builder or not. In the exemplary embodiment, this entails dividing the PPE (Property Plant and Equipment value for the component by the total revenue of the component and determining if the resulting ratio satisfies asset builder criteria, for example the ratio being greater than or equal to 40%. The threshold is generally in the range of 30% to 50% based on the main line of business; however, it may also change based on economic conditions or other empirical factors. If this metric is 40% or greater, execution branches via arrow B-B to step B28, which entails tagging or otherwise designating the component as an asset builder, within a classified business model database. Else, execution advances to decision step A12.

Step A12 entails determining whether the component is a potential technology creator. In the exemplary embodiment, this entails determining a ratio of total Research and Development (R&D) spending for the component to revenue, and comparing this ratio to a threshold within a range of 10 to 25%, such as 15%, based on the main line of business. If the ratio is 15% or greater, the component is deemed a potential technology creator at step A14. Execution then advances to decision step B8, as indicated by arrow D-D.

At step B8, the exemplary system queries for network orchestrator terms in the most recent 10K annual report. If network orchestrator terms are found, the component is designated a probable network orchestrator at step B18. Otherwise, the component is designated a probable technology creator at step B14.

In some embodiments, components that did not have an R&D/Revenue ratio greater than 15% at step A12 are designated as wildcards and execution proceeds to step B2 as indicated by arrow C-C. Wildcards are examined for terms related to each business model (in their most recent 10K annual report) in decision steps B2 (asset builder), B4 (service provider), B6 (technology creator), and B8 (network orchestrator). The sequence of these business models classification steps is determined by their frequency in the market, asset builders being the most commonly found business model, service provider the next most common, etc. Each of these decision steps, B2, B4, B6, and B8 designates the component as a probable business model at steps B10, B12, B14, and B16.

Exemplary Composite Business Model

Some embodiments of the invention provide a composite business model rather than singular business model classification as described above, recognizing that in reality, most companies operate multiple business models in parallel. For example Amazon is largely Asset Builder, but also acts as a Technology Creator and even a Network Orchestrator. Macy's, on the other hand, acts more as a "pure play" with nearly all capital allocation in the Asset Builder model. To determine a company's composite business model score (the business models that it uses and in what proportion), the exemplary embodiment uses a machine-learning trained algorithm. This algorithm uses available information about publicly traded companies to interpret their asset allocation and leadership mindset in order to determine a composite business model.

Specifically, the exemplary system examines all of the fields available from the Factset North America Annual database for publicly traded companies, plus word counts of the top 1000 commonly used words in the annual reports (pulled from the EDGAR database). Some embodiments may augment the set of commonly used words with words or phrases that less common and believed to have positive or negative correlations with one or more of the business model classes. For example, words and phrases, such as "platform," "average monthly user," and "network," may be determined to correlate with a network orchestrator classification. In total, the training data included 5050 variables for each company.

A machine learning module employing LASSO (Least Absolute Shrinkage and Selection Operator) regularization (a methodology for identifying variables which are both relevant and distinct in very large datasets) and logistic regression to determine which of these 5050 variables were relevant to each of the four exemplary business models, and to what degree. (Some embodiments may use other forms of regression analysis such as and/or other forms of regularization, such as ridge or ElasticNet.) Once key variables were identified, the machine learning system was trained on a dataset of 2676 companies that were hand-classified by two researchers who determined each company's primary business model based on a review of its annual report. This training set gave the machine learning system content to analyze in order to determine what characteristics (asset allocation, or suitable proxies, and language) were commonly found in each business model. The exemplary embodiment developed a logistic regression equation that calculates a company's preference for each business model on a scale of 0 to 1.

More precisely, using the generalized linear model, the exemplary embodiment formulated an estimated logistic regression equation for each business class based on the selected variables. For the asset builder (AB) class, the estimated probability or preference of a company n for the AB class given input data $x_1, \ldots x_p$ for that company is computed as $$\text{Estimate of } P(AB_n=1|x_1, \ldots, x_p) = 1/(1+e^{-(\alpha+\Sigma_k b_k x_k)})$$

The coefficients a and $b_k$ (k=1, 2, ..., p) were determined according to a maximum likelihood approach using the training data. Thus, it allows us to estimate the probability or preference of the dependent variable AB (whether the business is an asset builder) taking on the value 1 for given input values of $x_k$ (k=1, 2, ..., p). FIG. 3A shows an exemplary data structure which defines the exemplary data inputs and associated coefficients for the asset builder portion of the composition score.

Similarly, for the Service Provider (SP) class, Technology Creator (TC) class, or Network Operation (OP) class, the probability may be computed using the respective logistic regression equations:

$$\text{Estimate of } P(SP_n=1|x_1, \ldots, x_p) = 1/(1+e^{-(\alpha+\Sigma_k b_k x_k)}),$$

where the x data inputs and coefficients are defined in FIG. 3B.

$$\text{Estimate of } P(TC_n=1|x_1, \ldots, x_p) = 1/(1+e^{-(\alpha+\Sigma_k b_k x_k)}),$$

where the x data inputs and coefficients are defined in FIG. 3C.

$$\text{Estimate of } P(NO_n=1|x_1, \ldots, x_p) = 1/(1+e^{-(\alpha+\Sigma_k b_k x_k)}),$$

where the x data inputs and coefficients are defined as in FIG. 3D.

FIGS. 3A-3D also show that most of the input variables are logically associated with one of the five capital types: physical capital (P), human capital (H), intellectual capital (I), network (or relationship) capital (N or R), or financial capital (F). These capital types are generally defined as follows:

Physical capital—physical assets such as inventory and plant, property, & equipment Human capital—human assets such as employees and contractors Intellectual capital—IP-based capital such as patents, software, and biotechnology Network (or Relationship) capital—relationship based capital, such as relationships with networks Financial capital—assets like cash, stocks, and bonds Below is a selection of some of the most significant input variables associated with each business model class:

Asset Builders

Inventories/Current Assets (Physical capital, positively associated)

Capital expenditure/Total Assets (Physical capital, positively associated)

Use of the word "site" (Physical capital, positively associated)

R&D/Sales (Intellectual capital, negatively associated)

Service Providers

Use of the word "personnel" (Human capital, positively associated)

Use of the word "consult" (Human capital, positively associated)

Inventories/Total Current Assets (Physical capital, negatively associated)

R&D/Sales (Intellectual capital, negatively associated)

Technology Creators

R&D/Sales (Intellectual capital, positively associated)

Use of the word "user growth" (Relationship capital, negatively associated)

Network Orchestrators

Use of the word "website" (Relationship capital, positively associated)

Use of the word "platform" (Relationship capital, positively associated)

The follow table shows an example of the output business model component scores for Ford Motor Company, Accenture, Pfizer, and Yelp:

| Company | AB score | SP score | TC score | NO score |
|---|---|---|---|---|
| Ford Motor | 0.882469574 | 0.029711634 | 0.000737475 | 0.004475898 |
| Accenture | 0.073067629 | 0.980836076 | 0.000152239 | 0.002841597 |
| Pfizer | 0.209542165 | 0.025371407 | 0.93975603 | 0.004291592 |
| Yelp | 0.000592891 | 0.057841102 | 0.932559044 | 0.936644343 |

By determining the percentage of total points (or weight) allocated for each business model, the exemplary embodiment determines a composite business model score as shown below. Specifically, a company's percentage classification as an Asset Builder is determined by the equation:

AB %=AB score/(AB score+SP score+TC score+NO score)

And similarly, its SP %, TC %, and NO % are calculated as follows:

SP %=SP score/(AB score+SP score+TC score+NO score)

TC %=TC score/(AB score+SP score+TC score+NO score)

NO %=NO score/(AB score+SP score+TC score+NO score)

The table below shows that the scores for each business model class can be assembled into a searchable data structure:

| Company | AB % | SP % | TC % | NO % |
|---|---|---|---|---|
| Ford Motor | 96% | 3% | 0% | 0% |
| Accenture | 7% | 93% | 0% | 0% |
| Pfizer | 18% | 2% | 80% | 0% |
| Yelp | 0% | 3% | 48% | 49% |

Exemplary Universal Scoring

As in the non-composite score, it is possible and desirable to use scoring module 126 (FIG. 1) to create a score using the composite business module that captures current business model, business model trajectory, and industry positioning. The scoring algorithm uses four pillars and six factors to score each company, with each pillar or factor contributing to addition of one or more points to an aggregate score. In addition to allocating points based on a company's business model itself, points are also allocated based on other indicators correlated with the best performing business models. Scoring with these factors allows one to track and reward companies that may be in the middle of business model evolution, or companies that operate better business models than their key industry competitors. The exemplary scoring system determines a score based on the composite business model points, growth, scalability, industry positioning, using the following attributes or pillars:

Pillar I: Business model (or Vision). Points are awarded based on business model composition, with more points awarded for companies using the Network Orchestrator model, which generally viewed as a superior model in terms of overall performance relative to other business models in the market, and fewer points awarded for the Asset Builder model as determined by the machine learning methodology.

Pillar II: Growth. This pillar was included to capture the high-growth aspect of the best business models (Network Orchestrator and Technology Creator), which leverage intangible assets, such as knowledge, and software, plus external networks to achieve high growth. To measure growth, two factors were considered: 1 year net revenue growth, which measures historic growth, and R&D spend as a percentage of revenue, which anticipates future growth.

Pillar III: Scalability. This pillar was included to capture the low scaling cost of the best business models (Network Orchestrator and Technology Creator), which achieve low marginal cost of growth by using intangible assets like intellectual property, software, and digital platforms. To measure scalability, two factors are considered: PPE as a percentage of revenue, which indicates the firm's reliance on tangible, difficult-to-scale assets, and revenue per employee, which indicates the firm's reliance on human capital assets, which are also difficult to scale. PPE as a percentage of revenue is an inverse factor, where a higher percentage will result in a lower allocation of points.

Pillar IV: Industry Positioning. This pillar is included to capture how well positioned a company is, from a business model perspective, compared to its primary competitors—its industry peers (as identified using NAILS industry classifications). By comparing a company's score on pillars I, II, and III to its industry's average, the exemplary system can identify companies that are outperforming their peers on key business model factors and may be business model leaders for their industries.

To arrive at a company's score, the exemplary embodiment averages each company's allocated points from the six factors above: business model, 1 year net revenue growth, R&D spend as a percentage of revenue, PPE as a percentage of revenue, revenue per employee, and industry positioning, with business model double-weighted. The overall resulting scores are between 1 and 10. Scores are stored in separate list structure and/or in logical association with corresponding business entity data within business database 126 (FIG. 1), where it can be accessed and output as a ranked list in combination with other queries submitted through access device 130. The scores can also be used as previously detailed for the scoring of the non-composite business model classification.

Once a business model has been designated, the system identifies at decision step B35 that it can continue to the scoring process. If there are more components to review identified at step B36, the system returns to select a new component at step A4. If the decision is made not to continue to scoring, and all components have been classified as determined at step B36, the system will continue to step C42 with complete classification data as indicated by arrow E-E.

Some embodiments allow for scoring of the classifications using scoring module 125 in FIG. 1. This scoring may proceed according to the flow in FIGS. 2A-2C, specifically, If, at step B35, the decision is made to continue to scoring (via scoring module 125 in FIG. 1), the components will be recompiled into a single database, step B38, and the system proceeds in parallel to steps C8. C16 and C24 as indicated by arrow F-F. Each component will be scored separately on multiple dimensions, which are designated as pillars in the construction illustrated in FIG. 3. In this process flow, four pillars are scored, the first three in parallel.

For the Vision Pillar, points are assigned in step C6 based on the business model compositions scores generated by the machine learning algorithm and completed previously in the process flow. The points allocated are determined by the following formula:

Vision score=AB score*2.5+SP score*5+TC score*7.5+NO score*10

These points become the Vision Score in step C2.

For Scalability, in step C16 the dataset is broken into quartiles for each of two metrics: Net PPE divided by Revenue, and Revenue per Employee. Points are assigned in step C14 based on where each component falls within the decile breakdown. Companies in the highest decile of Net PPE/Revenue receive one point, and those in the lowest quartile receive ten. Companies in the highest decile of Revenue per Employee receive ten points, and those in the lowest receive one. In step C12 the points assigned in C14 are averaged, resulting in the Scalability Score in step C10.

For Growth, in step C24 the dataset is broken into deciles Revenue Growth. Companies in the highest decile of Revenue Growth receive ten points, and those in the lowest receive one. For R&D as a percentage of revenue, points are awarded according to the framework below:

0%=0
0.1%-2%=2
2.01%-5%=4
5.01%-10%=6
10.01%-20%=8
>20.01%=10

In step C20 the points assigned in C22 are averaged, resulting in the Growth Score in step C18.

The Vision, Scalability, and Growth scores are then combined in step C26 by taking the average of the three scores. This average is the Preliminary Score for Step C28.

Then, the fourth pillar, Competition, is analyzed beginning in step C36. Each component is grouped with industry peers based on NAICs industry sector. The Preliminary Scores for each industry sector are then broken down by decile and points are assigned based on where each component falls within its industry deciles. Decile 10 components, with the highest Preliminary Scores, are awarded ten points, and decile 1 components only one point in step C30.

In step C38, the Competition score is integrated with the Preliminary Score based on the first three pillars. The preliminary score is then multiplied by 6, then the Competition score is added, and the sum is divided by 7. The result is the Final Score in Step C40.

Note that although this process flow uses four pillars (Vision, Scalability, Growth, and Competition) and examines one or two relevant metrics for each, other structures with other pillars and other metrics are possible as well.

Based on the Final Scoring in step C40, which includes a score for each component in the database, a number of outputs are possible. The scores can be used to create a database of companies classified by business model, step C42, which may be useful to track over time for changes in characteristics and to evaluate business model transformations and trends at the company, industry group/sector and market levels such as through a Business Model Audit C47, a Visualization C49 or Threat Analysis Products C51 which are described below in more detail in relation to FIGS. 5, 7 and 6, respectively. The scores also can be used to create a ranking of companies, step C44, which can be published in a variety of ways as Publication Products C53 and used by managers to help make better business decisions. The Final Scoring can also be used to create an investment index, C46, such as an ETF (exchange traded fund) C55. A portion of the top companies by score, or a portion of the top companies among each business model, can be used to create an investment vehicle such as an exchange traded fund.

Some embodiments utilize the classifications, rankings, or scorings within business model database 125, to generate one or more custom portfolios of securities for monitoring or investing. In some embodiments, the portfolio takes the form of a simple basket of stocks or an ETF (Exchange-Traded Fund) which tracks against an index. For example, by accessing a database of companies, for example database 125, which have been classified, ranked and scored as described herein, an experienced financial professional may be able to create a number of portfolios, or ETFs, tailored to specific levels of risk and reward using the classifications, ranks, and scores of components. For example, a financial professional may wish to make a portfolio composed only of high-scoring components classified as asset builders, or a mixed portfolio composed of the highest-scored components in each business model category. Financial professionals may also combine business model classification and score with other available financial and non-financial information to improve decision-making. For example, a financial professional may review the historical performance of a set of components against their ranks and scores in order identify components potentially undervalued by the market and use these assessments to create a portfolio of components for investment.

Additionally, some embodiments may utilize database 125 to retrieve the classifications and scores for two or more businesses for purposes of direct comparison and contrast, as well as identifying trends and correlations and opportunities for improvement against peers. For example, an experienced management professional or expert AI driven software module may be able to identify allocation patterns, such as acquisitions or capital investment, that are associated with higher scoring and ranking in this method. By tracking these patterns within the context of the overarching business model, leaders can not only better evaluate the strength and trajectory of current and potential competitors, but also better identify capital allocation decisions which will increase the score and rank of their own organizations, leading to competitive advantage. Management professionals can also gain new insight into their components positioning by tracking changes in business model classification of current or potential competitors, allowing them to better identify new market competition or new market niches which may otherwise have gone unnoticed based on traditional industry-siloed analysis.

Exemplary Output Module

The three outputs discussed above, classification data C42, rankings C44, and indices C46 can be used in a variety of different products. Five examples are shown in FIGS. 4-8 as flowcharts D, E, F, G, H and detailed below.

Figure 4:
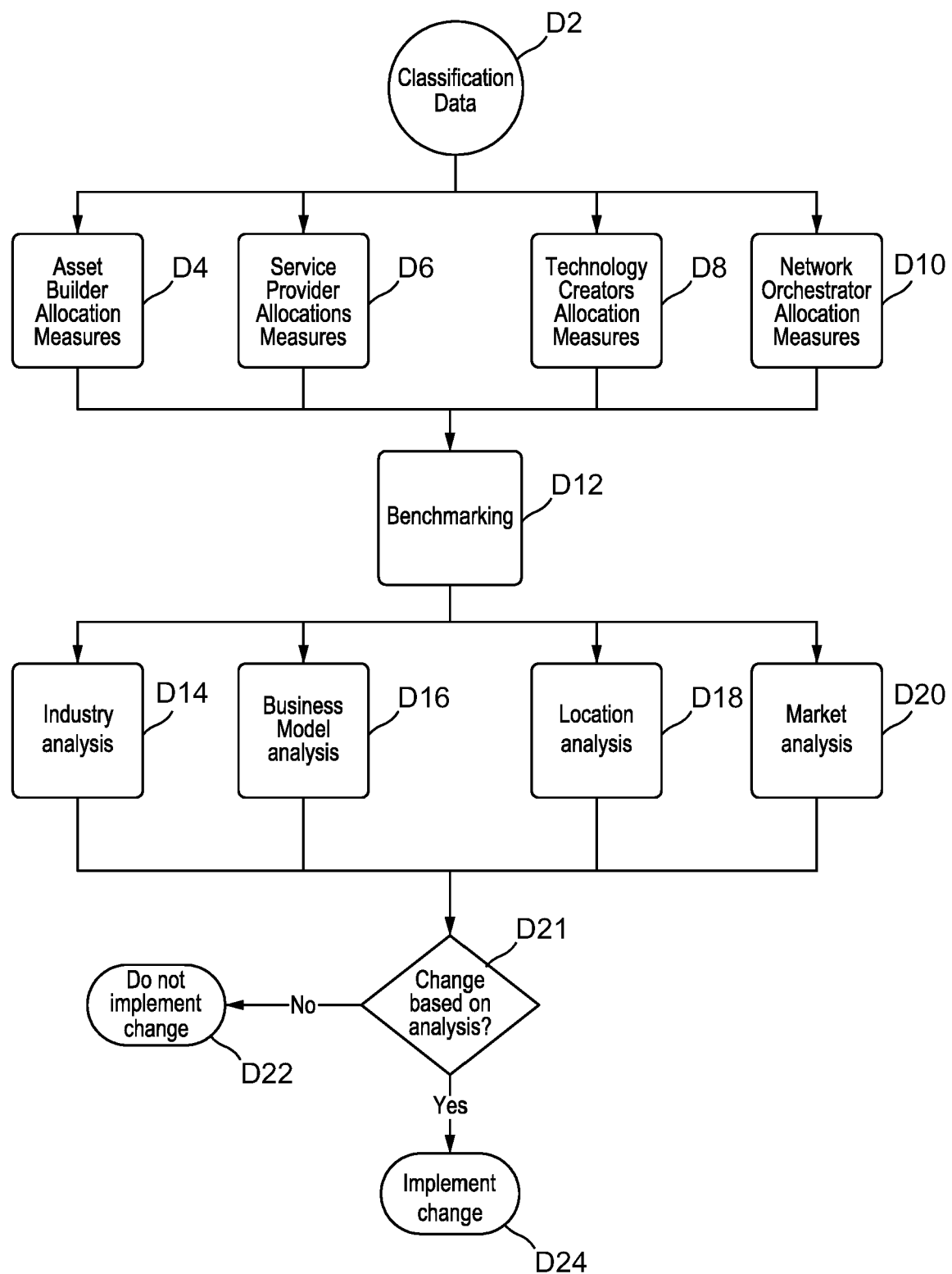
FIG. 4 is a flowchart of a Business Model Audit, corresponding to one or more embodiments of the present invention.

In FIG. 4, flow chart D shows an exemplary business method audit method which provides users with powerful data points and analysis based on business model research, enabling users to implement positive changes or avoid negative consequences through hypothetical analysis of key indicators and controls that affect performance. The exemplary audit process begins at D2.

Using Classification Data, D2, as the data source, the user of the audit product aggregates allocation measures of Asset Builders, D4, Service Providers, D6, Technology Creators, D8 and Network Orchestrators, D10. These measures are then benchmarked against the user's company measures, D12. Comparison over time may eventually be used to generate analysis by industry, D14, business model, D16, geographic locations, D18 or by market, D20. Analysis may yield a decision point, D21 in which managers may decide not to implement change, D22, or to implement change, D24.

Figure 5:
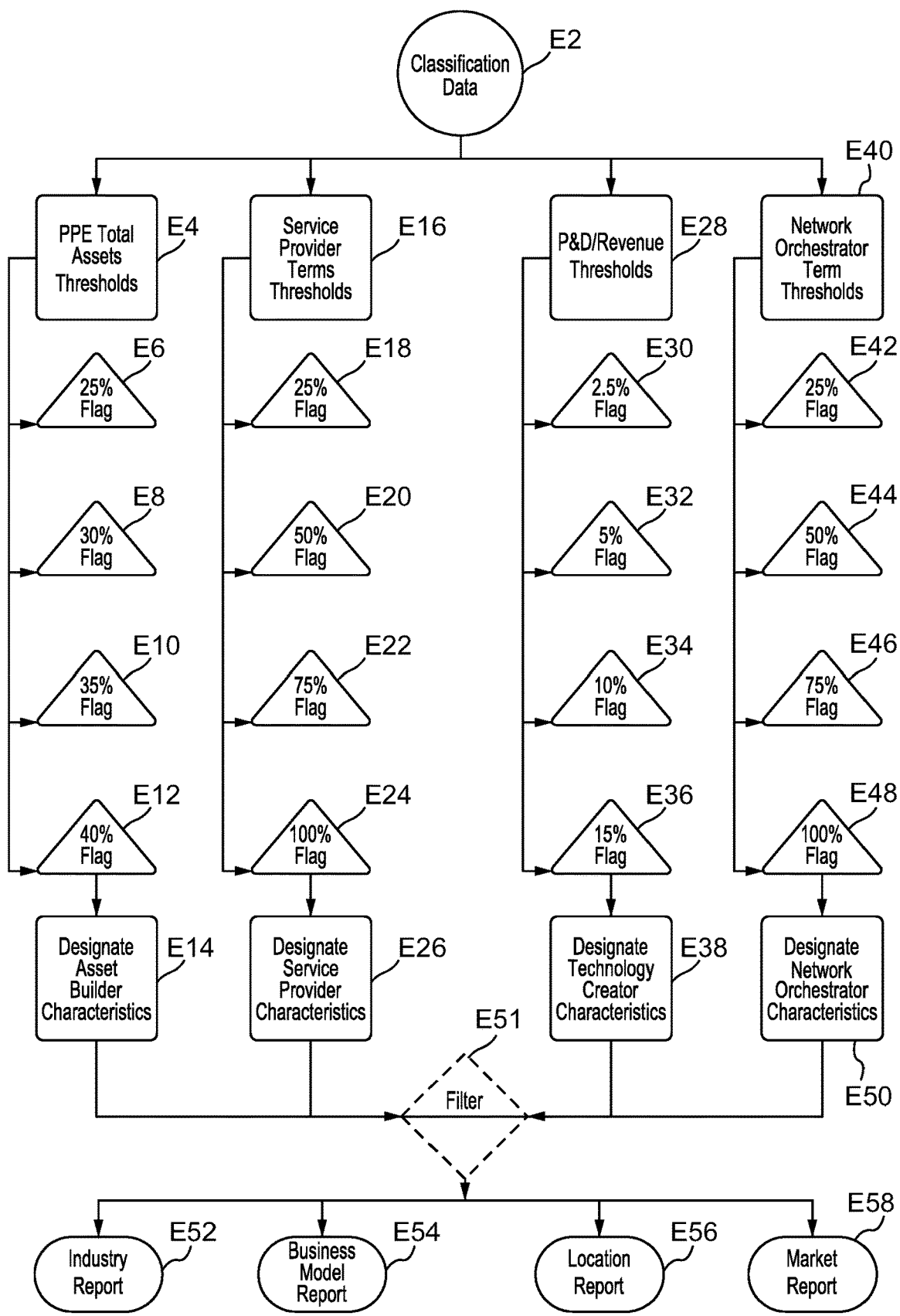
FIG. 5 is a flowchart of Threat Analysis Products, corresponding to one or more embodiments of the present invention.

FIG. 5 shows an exemplary threat analysis method which detects incremental and total changes in business model based on analysis of their defining characteristics, enabling users to better monitor the competitive landscape and correctly position themselves for success or mitigate potential loss of advantage.

In exemplary embodiment construction of a system and method according to the present invention utilizing Classification Data, E2, as the data source, the threat analysis product will track the primary business model measure, PPE/Total Assets percentage, E4, Service Provider terms percentage, E16, R&D/Revenue percentage, E28 AND Network Orchestrator terms percentage, E40. These measures are broken down into 'flag' and 'alert' thresholds, wherein a flag is a notation of a trend and an alert is triggered when a measure has reached the requirement for potential secondary designation.

For asset builders according to one embodiment there are flags at 25%, E6, 30%, E8, 35%, E10, of PPE/Total Assets percentage. In a further embodiment, when a component reaches 40% PPE/Total Assets percentage there is an alert, E12, that leads to a designation of Asset Builder characteristics indicating this component may meet asset builder business model criteria.

For service providers, some embodiments define flags at 25%, E18, 50%, E20, 75%, E22 of terms type analysis. In a further embodiment, when a component reaches 100% service provider terms, there is an alert, E24, that leads to a designation of Service Provider characteristics indicating this component may meet service provider business model criteria.

For technology creators, in one embodiment there are flags at 2.5%, E30, 5%, E32, 10%, E34 of R&D/Revenue percentage. In a further embodiment, when a component reaches 15% R&D/Revenue percentage there is an alert, E36, that leads to a designation of Technology Creator characteristics indicating this component may meet Technology Creator business model criteria.

For network orchestrators according to one embodiment, there are flags at 25%, E18, 50%, E20, 75%, E22 of terms type analysis. In a further embodiment, when a component reaches 100% service provider terms, there is an alert, E24, that leads to a designation of Network Orchestrator characteristics indicating this component may meet network orchestrator business model criteria.

Figure 6:
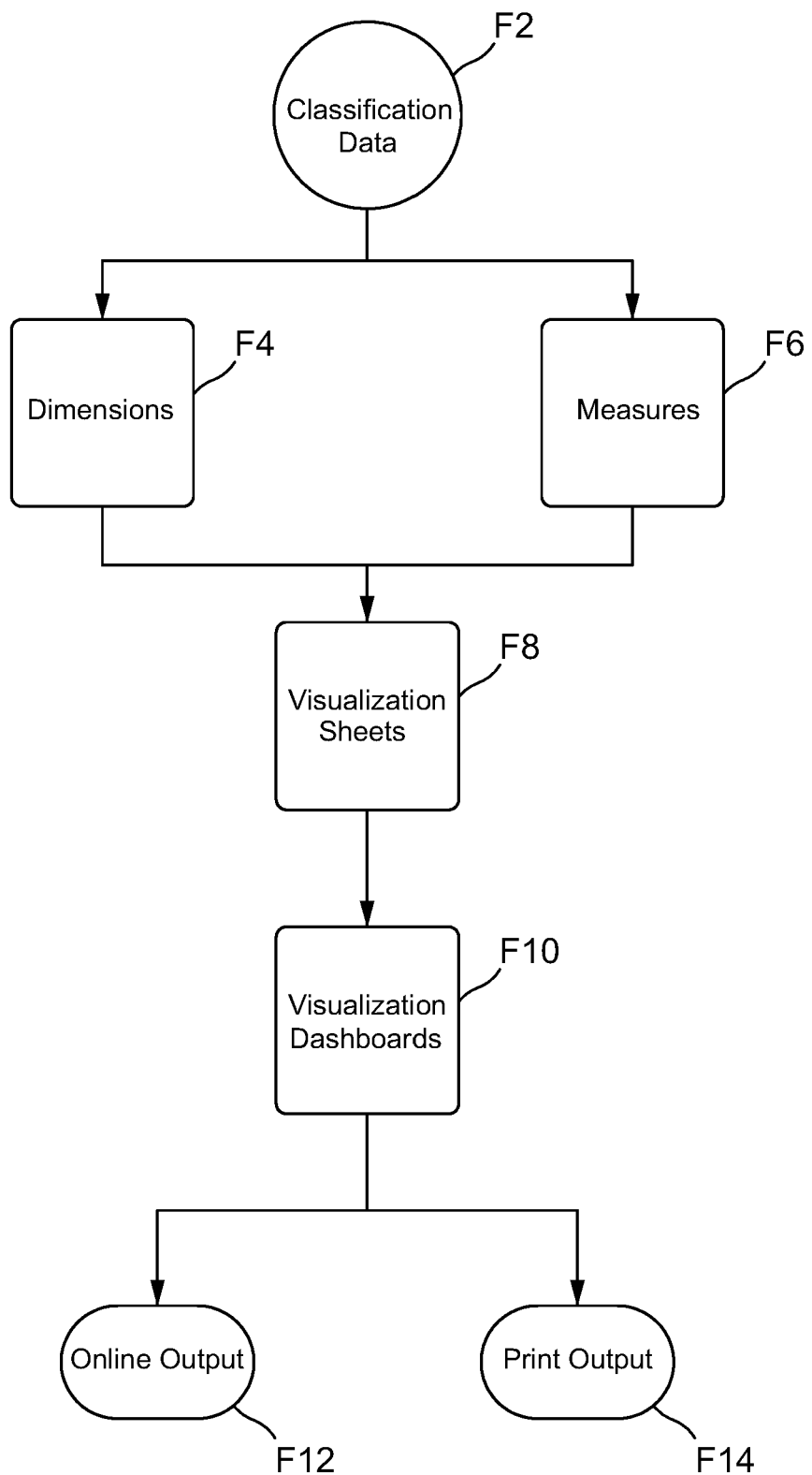
FIG. 6 is a flowchart of generating certain Visualizations, corresponding to one or more embodiments of the present invention.

These alerts may be filtered, as indicated by optional Filter E51, into variable reports based on industry, E52, business model, E54, location, E56 or market, E58. The purpose of visualizations generated by flow chart F, FIG. 6, is to generate visual representations of the Classification Data for internal uses, such as company documents, or external use, such as marketing collateral. is the visualizations enable a user to better explain changes in large datasets over time with a visual representation as opposed to character based data only.

Using Classification Data, F2, as the data source the user of a visualization product may define different dimensions, F4, and measures, F6. The combination can create visualization sheets, F8 which are individual data visualization of various type including, histogram, scatter plot or bubble chart for example. These sheets may also be combined to create dashboards, F10, which in one construction is multiple sheets combined with narrative in order to tell a cohesive story about the data. These sheets and other types of dashboards may be output online, F12, or in print, F14, for the previously described purposes.

Figure 7:
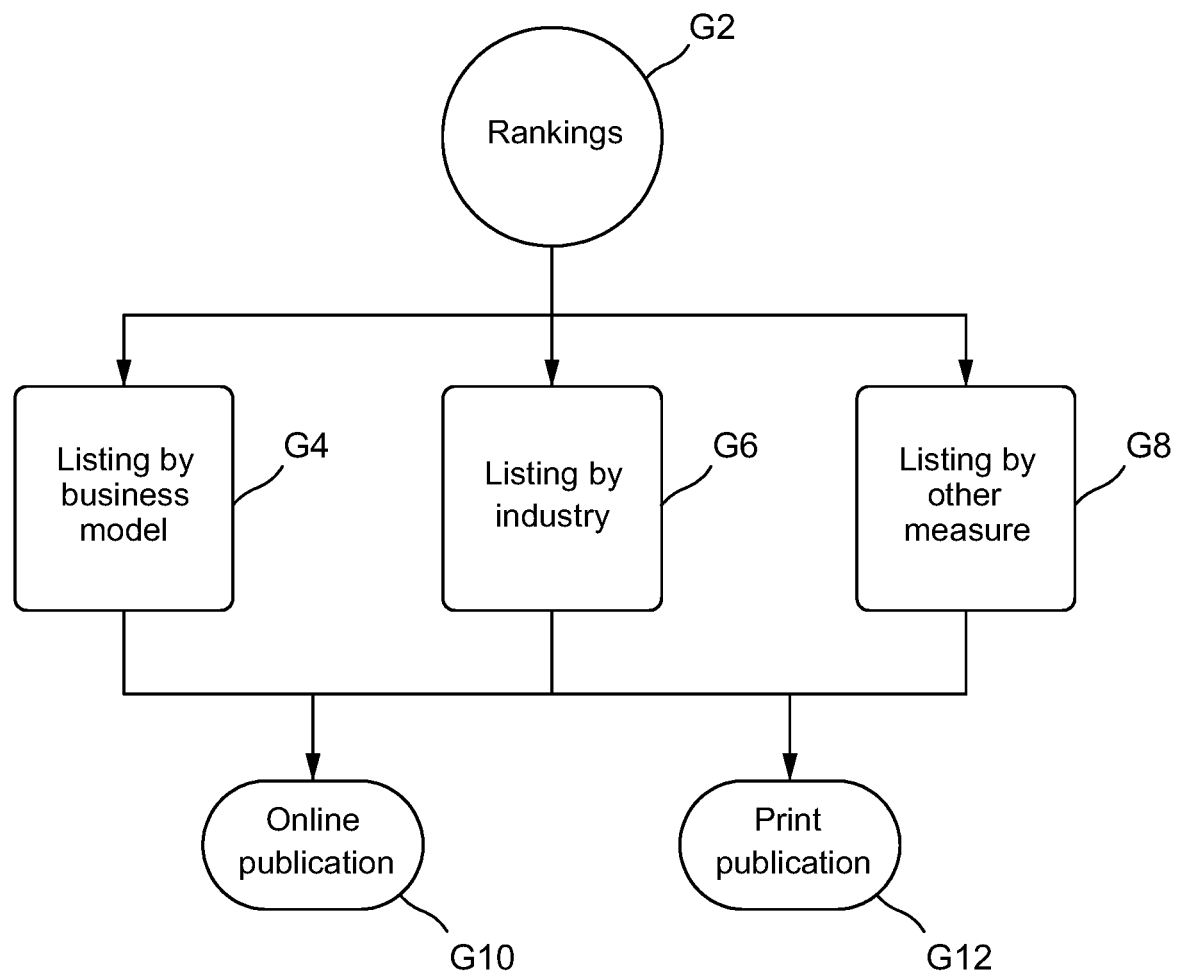
FIG. 7 is a flowchart of certain Publication Products, corresponding to one or more embodiments of the present invention.

The purpose of publication products generated by flow chart G, FIG. 7, is to harness Rankings to create consequential distinctions between components within and across business model classifications for the purposes of showing hierarchal differentiation along a number of measures including best overall, best in business model or best in a specific measure such as revenue per employee, allowing users to periodically publish changes in rankings over time and thus create awareness and generate advertising interest in the product.

Using Rankings, G2, as the data source, the user seeking to generate a publication product may take the whole scores and ranks to create listings by business model, G4, industry, G6, or some other defined measure, G8. These rankings may be used either online, G10 or print, G12, publication formats.

Figure 8:
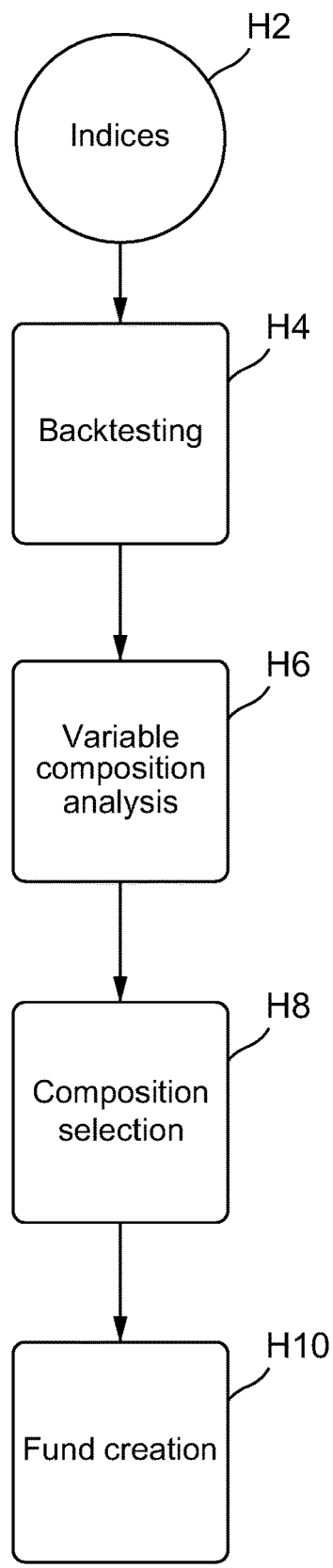
FIG. 8 is a flowchart of generating an EFT (exchange traded fund), corresponding to one or more embodiments of the present invention.

The purpose of ETF products generated by flow chart H, FIG. 8, is to develop investment vehicles which would allow investors to gain exposure to the best performing companies by business model. The value is a user can develop a portfolio of securities which can be tracked against established indices and invested in.

Using indices, H2, as the data source, the user seeking to create an ETF product may conduct back testing, H4, of a combination of components contained index in order to evaluate them for inclusion based on their individual and aggregate historical performance. The user may then test the composition weighting, H6 in order to determine the best performing product leading to component selection, H and fund creation, H10.

Figure 9:
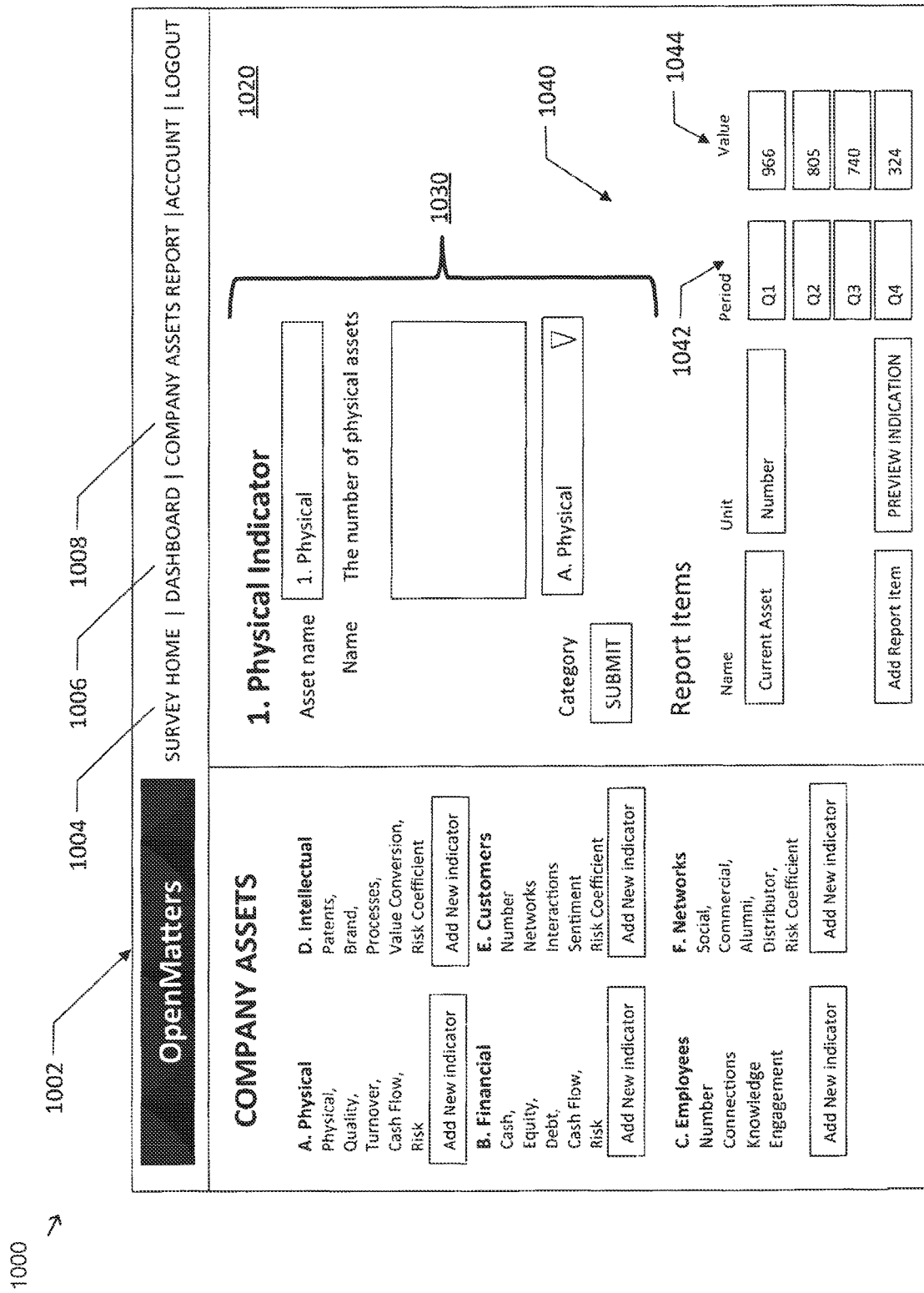
FIG. 9 is a graphical representation of a web-based tool, corresponding to one or more embodiments of the present invention, with the tool configured to monitor key performance indicators and to identify opportunities for improvement or disruptions which may threaten success.

Screenshot 1000, FIG. 9, is a graphical representation of a web-based tool for reporting and monitoring key performance indicators to identify opportunities for improvement or disruptions which may threaten success. Upper banner 1002 has indicia representing additional screens or pages such as SURVEY HOME 1004, DASHBOARD 1006, COMPANY ASSETS REPORT 1008. Other functionality includes ACCOUNT 1010 and LOGOUT 1012. Company Assets are shown in Field 1020 in the categories of: A. Physical including 1. Physical, 2. Quality, 3. Turnover, 4. Cash Flow, and 5. Risk Coefficient; B. Financial including 1. Cash, 2. Equity, 3. Debt, 4. Cash Flow, and 5. Risk Coefficient; C. Employees including 1. Number, 2. Connections, 3. Knowledge, and 4. Engagement; D. Intellectual including 1. Patents, 2. Brand, 3. Processes, 4. Value Conversion, and 5. Risk Coefficient; E. Customers including 1. Number, 2. Networks, 3. Interactions, 4. Sentiment, and 5. Risk Coefficient; and F. Networks including 1. Social, 2. Commercial, 3. Alumni, 4. Distributor, and 5. Risk Coefficient. Each of the categories includes a soft button for "Add a new indicator". Fields 1030 are set for input of "1. Physical" such as the number of physical assets of the selected company for the category of "A. Physical". Fields 1040 include Report Items such as quarterly Periods 1042 and corresponding Values 1044.

Figure 10:
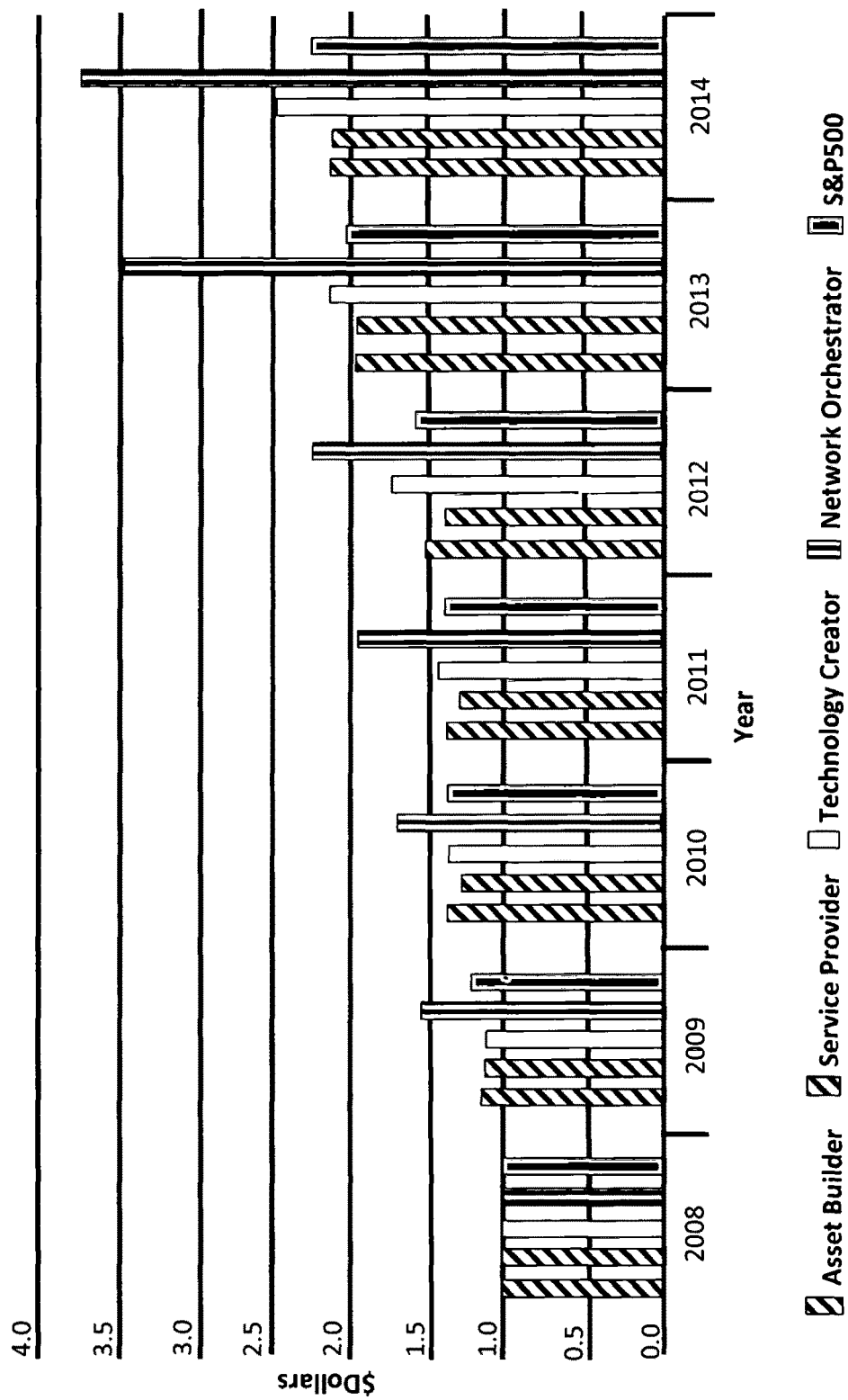
FIG. 10 is a graphical representation of data visualization derived from classification data, showing the relative performance of a one-dollar investment from 2008-2014 and corresponding to one or more embodiments of the present invention.

FIG. 10 is a graphical representation of data visualization derived from classification data, showing the relative performance of a one-dollar investment from 2008-2014 for Asset Builder, Service Provider, Technology Creator, Network Orchestrator and S&P 500. Network Orchestrator rises to 3.5 dollars in 2013, yet all other model types remain below 2.5 dollars throughout this time period.

Figure 11:
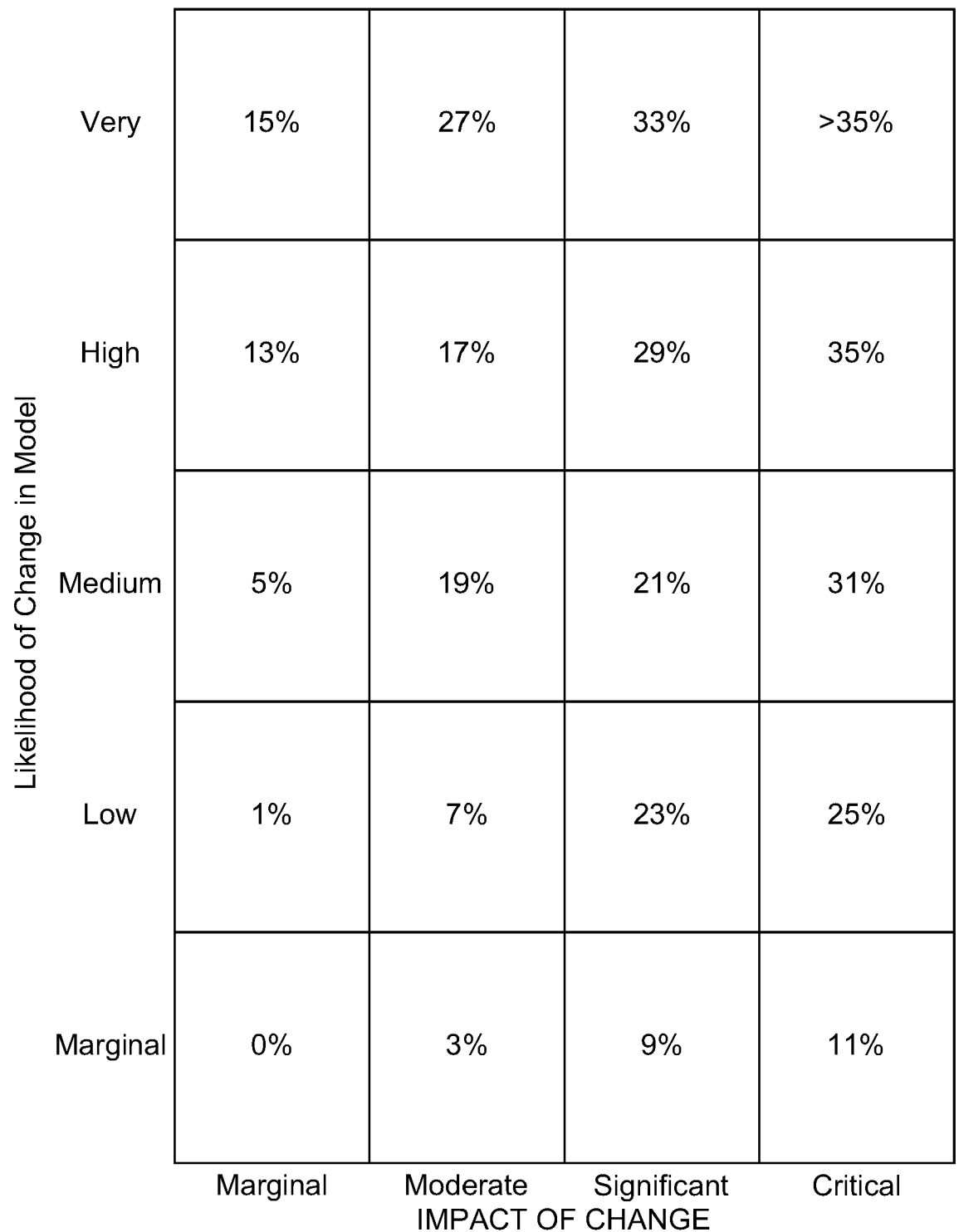
FIG. 11 is a graphical representation of a risk profile map according to the present invention monitoring a competitor's Research and Development investment to determine the likelihood and impact that a change in business model by the competitor may impact the observing company.

FIG. 11 is a graphical representation of a risk profile map monitoring a competitor's Research and Development investment to determine the likelihood and impact that a change in business model by the competitor may impact the observing company. The X-axis has IMPACT OF CHANGE ranging from Marginal, Moderate and Significant to Critical. The Y-axis has Likelihood of Change in Model ranging from Marginal, Low, Medium, High to Very High.

Figure 12B:
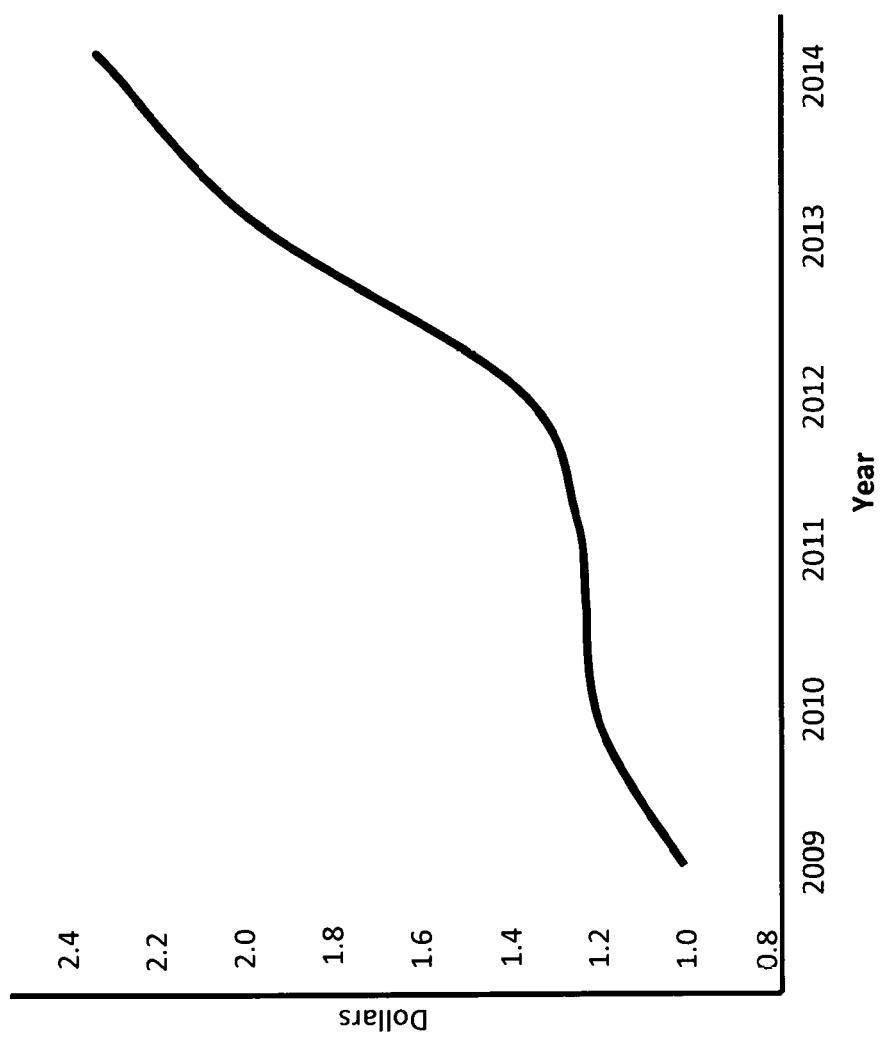
FIG. 12B is a graph representing back-testing of the ETF fund of FIG. 12A showing return on investment from 2008-2014.

FIG. 12A is an example of a prototype ETF fund structure having 43 companies representing the top ten percent of Business Model scorings from the S&P 1500 companies. In this exemplary fund, the four business model types are represented, and each is presented with equal weighting. FIG. 12B is a graph representing back-testing of the ETF fund of FIG. 12A showing return on investment in Dollars from 2008-2014.

CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments, for example those involving smartphones, tablets, computers, smart watches, may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments can be implemented as a computer-readable storage medium having computer readable code stored thereon for programming a computer (e.g., including a processor) to perform a method as described and claimed herein. Likewise, computer-readable storage medium can include a non-transitory machine readable storage device, having stored thereon a computer program (machine executable instructions) that include a plurality of code sections for performing operations, steps or actions as described herein.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A computer-implemented method using machine learning for composite scoring based on quantitative data and qualitative data, the method comprising:
    receiving input comprising a training dataset of a plurality of entities engaged in business and corresponding classifications, wherein the corresponding classifications comprise an asset builder class, a service provider class, a technology creator class, and a network orchestrator class;
    using machine learning comprising one or more of regression analysis or regularization to generate an algorithm for classifying and scoring the plurality of entities based on the training dataset;
    extracting quantitative data based on one or more metrics for an entity engaged in business;
    performing data mining to extract qualitative data from textual description regarding the entity;
    deriving a composite score for the entity based on the extracted quantitative data, the extracted qualitative data, and the algorithm generated based on the machine learning, wherein the composite score is based on a combination of two or more of a first estimated probability corresponding to at least the asset builder class, a second estimated probability corresponding to the service provider class, a third estimated probability corresponding to the technology creator class, and a fourth estimated probability corresponding to the network orchestrator class; and
    presenting, via a user interface, the derived composite score for the entity.

2. The method of claim 1, wherein extracting the quantitative data includes extracting one or more of an extracted sales quantity, a revenue quantity, or a profit quantity from an annual report or a 10 k filing for the entity.

3. The method of claim 1, wherein the corresponding classifications are associated with respective business model classes in an industry-agnostic business model classification.

4. The method of claim 3, further comprising:
    receiving a query identifying a business model class from the industry-agnostic business model classification; and
    retrieving, from a database, a set of one or more business entity identifiers in response to the query.

5. The method of claim 1, wherein the extracted qualitative data includes one or more extracted words or word stems, the method further comprising:
    determining at least one score based on one or more coefficients of a logistical regression equation describing an estimated statistical relationship of the entity to at least one class identifier based on the one or more of the extracted words or word stems.

6. The method of claim 1, further comprising:
retrieving from a database a first quantity representative of a first business capital allocation and second quantity representative of a sales or revenue quantity for the entity; and
determining a ratio of the first quantity to the second quantity for the entity, wherein the first estimated probability, the second estimated probability, the third estimated probability, and the fourth estimated probability are each based, at least in part, on the ratio.

7. The method of claim 6, wherein the first business capital allocation is a research and development expense.

8. The method of claim 6, wherein the first estimated probability, the second estimated probability, the third estimated probability, and the fourth estimated probability are determined based on respective first and second coefficients of a logistical regression equation describing an estimated statistical relationship of the entity to classifications based on the determined ratio and one or more of extracted words or word stems from the textual description regarding the entity.

9. The method of claim 1, further comprising:
monitoring for an updated composite score for the entity; and
sending an alert to a user when the updated composite score deviates from a prior composite score by a threshold amount.

10. The method of claim 1, further comprising:
presenting a derived composite score for each of multiple entities engaged in business; and
creating a ranking of the multiple entities based on the corresponding derived composite score.

11. The method of claim 10, wherein creating the ranking includes:
creating a business model weighted investment index based on the derived composite score for each of the multiple entities.

12. The method of claim 11, wherein the business model Weighted investment index comprises a business-model weighted exchange traded fund.

13. The method of claim 1, wherein the composite score is derived based on an estimate of an allocation pattern for a leadership of the entity.

14. The method of claim 13, wherein the derived composite score corresponds to a predicted performance of the entity.

15. The method of claim 13, wherein the derived composite score is further based on the estimate of a capital allocation mindset for the leadership of the entity.

16. The method of claim 1, wherein the composite score comprises the first estimated probability corresponding to at least the asset builder class weighted by a first weight, the second estimated probability corresponding to the service provider class weighted by a second weight, the third estimated probability corresponding to the technology creator class weighted by a third weight, and the fourth estimated probability corresponding to the network orchestrator class weighted by a fourth weight.

17. The method of claim 1, wherein the composite score further comprises a potential growth score based on research and development spending as a percentage of revenue for the entity, wherein a higher percentage receives more points in the composite score than a lower percentage.

18. The method of claim 1, wherein the composite score further comprises a business model scalability score based on plant property and equipment (PPE) value as a percentage of revenue for the entity.

19. A machine learning business entity classification system for composite scoring based on quantitative data and qualitative data, comprising:
memory; and
at least one processor coupled to the memory, the memory and the at least one processor configured to:
receive input comprising a training dataset of a plurality of entities engaged in business and corresponding classifications, wherein the corresponding classifications comprise an asset builder class, a service provider class, a technology creator class, and a network orchestrator class;
use machine learning comprising one or more of regression analysis or regularization to generate an algorithm for classifying and scoring the plurality of entities based on the training dataset;
extract quantitative data based on one or more metrics for an entity engaged in business;
perform data mining to extract qualitative data from textual description regarding the entity;
derive a composite score for the entity based on the extracted quantitative data, the extracted qualitative data, and the algorithm generated based on the machine learning, wherein the composite score is based on a combination of two or more of a first estimated probability corresponding to at least the asset builder class, a second estimated probability corresponding to the service provider class, a third estimated probability corresponding to the technology creator class, and a fourth estimated probability corresponding to the network orchestrator class; and
present, via a user interface, the derived composite score for the entity.

20. A non-transitory computer-readable medium storing computer executable code, the code when executed by a processor causes the processor to:
receive input comprising a training dataset of a plurality of entities engaged in business and corresponding classifications, wherein the corresponding classifications comprise an asset builder class, a service provider class, a technology creator class, and a network orchestrator class;
use machine learning comprising one or more of regression analysis or regularization to generate an algorithm for classifying and scoring the plurality of entities based on the training dataset;
extract quantitative data based on one or more metrics for an entity engaged in business;
perform data mining to extract qualitative data from textual description regarding the entity;
derive a composite score for the entity based on the extracted quantitative data, the extracted qualitative data, and the algorithm generated based on the machine learning, wherein the composite score is based on a combination of two or more of a first estimated probability corresponding to at least the asset builder class, a second estimated probability corresponding to the service provider class, a third estimated probability corresponding to the technology creator class, and a fourth estimated probability corresponding to the network orchestrator class; and
present, via a user interface, the derived composite score for the entity.

* * * * *